(12) United States Patent
Wang et al.

(10) Patent No.: US 11,743,854 B2
(45) Date of Patent: Aug. 29, 2023

(54) METHOD AND RELATED DEVICE FOR DETERMINING TIMING ADVANCE

(71) Applicant: HUAWEI TECHNOLOGIES CO., LTD., Guangdong (CN)

(72) Inventors: Xiaolu Wang, Hangzhou (CN); Hejia Luo, Hangzhou (CN); Chenlei Xu, Hangzhou (CN); Rong Li, Hangzhou (CN); Jun Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/671,335

(22) Filed: Feb. 14, 2022

(65) Prior Publication Data

US 2022/0167297 A1    May 26, 2022

Related U.S. Application Data

(63) Continuation of application No. PCT/CN2020/106776, filed on Aug. 4, 2020.

(30) Foreign Application Priority Data

Aug. 14, 2019   (CN) .......................... 201910750187.X

(51) Int. Cl.
   *H04W 56/00*   (2009.01)
   *H04B 7/185*   (2006.01)

(52) U.S. Cl.
   CPC .... *H04W 56/0045* (2013.01); *H04B 7/18513* (2013.01); *H04W 56/006* (2013.01)

(58) Field of Classification Search
   CPC ............ H04W 56/0045; H04W 56/006; H04B 7/18513

(Continued)

(56) References Cited

U.S. PATENT DOCUMENTS

| 6,732,051 B1 * | 5/2004 | Kirk ...................... G01S 19/485 701/472 |
| 2010/0106416 A1 * | 4/2010 | Yochum ............... G01C 21/165 701/469 |

(Continued)

FOREIGN PATENT DOCUMENTS

| CN | 104536293 A | 4/2015 |
| CN | 109842932 A | 6/2019 |

(Continued)

OTHER PUBLICATIONS

3GPP TS 38.213 V15.5 0 (Mar. 2019), "3rd Generation Partnership Project; Technical Specification Group Radio Access Network; NR; Physical layer procedures for control (Release 15)," Mar. 2019, 104 pages.

(Continued)

*Primary Examiner* — Nghi H Ly
(74) *Attorney, Agent, or Firm* — Fish & Richardson P.C.

(57) ABSTRACT

Example methods and apparatus for determining a timing advance are described. One example method includes obtaining ephemeris information of a satellite, where the ephemeris information includes coordinates of the satellite and an ephemeris error of the satellite. A timing advance is determined according to a preset rule based on the ephemeris information and location information of a terminal device, where the location information includes coordinates of the terminal device and a positioning error of the terminal device. The preset rule is determined by using a first horizontal distance, a first vertical distance, the ephemeris error, and the positioning error.

20 Claims, 12 Drawing Sheets

(58) Field of Classification Search
USPC ........ 370/326, 329, 328, 338, 341, 345, 350
See application file for complete search history.

(56) References Cited

U.S. PATENT DOCUMENTS

| | | | | |
|---|---|---|---|---|
| 2010/0204916 A1* | 8/2010 | Garin | ................... | G01S 19/45 |
| | | | | 701/532 |
| 2012/0221244 A1* | 8/2012 | Georgy | ................ | G01S 19/49 |
| | | | | 701/472 |
| 2019/0166453 A1* | 5/2019 | Edge | .................. | G01S 5/06 |

FOREIGN PATENT DOCUMENTS

| | | |
|---|---|---|
| EP | 3110203 A1 | 12/2016 |
| WO | 2013159618 A1 | 10/2013 |

OTHER PUBLICATIONS

Ericsson, "On random access procedures for NTN," 3GPP TSG-RAN WG2 #106, Tdoc, R2-1907296, Reno, Nevada, US, May 13-17, 2019, 5 pages.
Huawei, HiSilicon, "Consideration on additional measurements for RTK GNSS," 3GPP TSG RAN WG1 Meeting #90, R1-1712109, Prague, Czech Republic, Aug. 21-25, 2017, 4 pages.
Huawei et al., "Discussion on timing advance and RACH for NTN," 3GPP TSG RAN WG1 Meeting #97, R1-1905994, Reno, USA, May 13-17, 2019, 10 pages.
Office Action issued in Chinese Application No. 201910750187.X dated Oct. 25, 2021, 7 pages (with English translation).
PCT International Search Report and Written Opinion issued in International Application No. PCT/CN2020/106776 dated Nov. 11, 2020, 19 pages (with English translation).

* cited by examiner

METHOD AND RELATED DEVICE FOR DETERMINING TIMING ADVANCE

CROSS-REFERENCE TO RELATED APPLICATIONS

This application is a continuation of International Application No. PCT/CN2020/106776, filed on Aug. 4, 2020, which claims priority to Chinese Patent Application No. 201910750187.X, filed on Aug. 14, 2019. The disclosures of the aforementioned applications are hereby incorporated by reference in their entireties.

TECHNICAL FIELD

This application relates to the field of communication technologies, and in particular, to a method and a related device for determining a timing advance.

BACKGROUND

In the 5G new radio (5G new radio, 5G NR) standard protocol, user equipment (user equipment, UE) is also referred to as a terminal device, and a manner of initially accessing a network (that is, accessing a network device) is a contention-based random access manner. In a random access process, after receiving a random access preamble (random access preamble) sent by the terminal device, the network device needs to deliver a random access response (random access response, RAR) to the terminal device. The random access response carries a timing advance (timing advance, TA). The terminal device adjusts uplink timing by using the timing advance.

Satellite communication has features such as a large coverage area and flexible networking. Currently, academia and industry focus on a communication scenario of satellite-ground convergence in which a seamless connection between a non-terrestrial network (non-terrestrial network, NTN) and the ground is implemented, to implement true global coverage and global roaming. In an NTN scenario, because a round-trip delay from a satellite (which is used as the network device) to the terminal device is relatively high, before initial random access, the terminal device sends a random access preamble to the satellite by using the timing advance to apply for access.

The timing advance is usually calculated based on a location of the terminal device and ephemeris information (an orbital altitude of the satellite can be obtained). However, because an ephemeris error and a positioning error cause a relatively large timing advance error, the random access preamble sent by the terminal device by using the timing advance is prone to arrive at the satellite in advance. When the random access preamble arrives at the satellite in advance, intersymbol interference is generated in a subsequent random access process.

SUMMARY

Embodiments of this application provide a method and a related device for determining a timing advance. Because a positioning error of a terminal device and an ephemeris error of a satellite are considered in a process of determining the timing advance, a random access preamble sent by the terminal device by using the timing advance is prevented from arriving at the satellite in advance. This avoids intersymbol interference generated in a subsequent random access process.

According to a first aspect, an embodiment of this application provides a method for determining a timing advance. The method includes: A terminal device obtains ephemeris information of a satellite, where the ephemeris information includes coordinates of the satellite and an ephemeris error of the satellite, and the ephemeris error of the satellite is broadcast by the satellite. The terminal device determines, according to a preset rule, the timing advance based on the ephemeris information and location information of the terminal device, where the location information of the terminal device includes coordinates of the terminal device and a positioning error of the terminal device. The preset rule is determined by using a first horizontal distance, a first vertical distance, the ephemeris error, and the positioning error, where the first horizontal distance and the first vertical distance are calculated by using the coordinates of the terminal device and the coordinates of the satellite.

In this embodiment of this application, because the positioning error of the terminal device and the ephemeris error of the satellite are considered in a process of determining the timing advance, a random access preamble sent by the terminal device by using the timing advance is prevented from arriving at the satellite in advance. This avoids intersymbol interference generated in a subsequent random access process.

In a possible implementation of the first aspect, that the terminal device determines, according to a preset rule, the timing advance based on the ephemeris information and location information of the terminal device includes: The terminal device determines the timing advance based on the first horizontal distance, the first vertical distance, a first positioning error of the terminal device, and a first ephemeris error of the satellite, where the ephemeris error includes the first ephemeris error of the satellite, and the positioning error includes the first positioning error of the terminal device. The preset rule specifically includes: $TA = 2(\sqrt{H^2 + S^2} - D - E)/c$, where TA represents the timing advance, H represents the first vertical distance, S represents the first horizontal distance, D represents the first positioning error of the terminal device, E represents the first ephemeris error of the satellite, and c represents the light speed constant.

In this embodiment of this application, because the positioning error of the terminal device and the ephemeris error of the satellite are considered in the process of determining the timing advance, the timing advance determined according to the preset rule is closer to an actual delay situation, and it is ensured that the random access preamble sent by the terminal device by using the using timing advance can reach the satellite within a correct time period.

In a possible implementation of the first aspect, that the terminal device determines, according to a preset rule, the timing advance based on the ephemeris information and location information of the terminal device includes: The terminal device determines the timing advance based on the first horizontal distance, the first vertical distance, a horizontal positioning error of the terminal device, a vertical positioning error of the terminal device, and a first ephemeris error of the satellite, where the positioning error includes the horizontal positioning error of the terminal device and the vertical positioning error of the terminal device, and the ephemeris error includes the first ephemeris error of the satellite. The preset rule specifically includes: $TA = 2(\sqrt{(H-D_v)^2 + (S-D_h)^2} - E)/c$, where TA represents the timing advance, H represents the first vertical distance, S represents the first horizontal distance, $D_v$ represents the vertical positioning error of the terminal device, $D_h$ represents the horizontal positioning error of the terminal device, E represents the first ephemeris error of the satellite, and c represents the light speed constant.

In this embodiment of this application, because the vertical positioning error of the terminal device, the horizontal positioning error of the terminal device, and the ephemeris error of the satellite are considered in the process of determining the timing advance, the timing advance determined according to the preset rule is closer to an actual delay situation, and it is ensured that the random access preamble sent by the terminal device by using the using timing advance can reach the satellite within a correct time period.

In a possible implementation of the first aspect, that the terminal device determines, according to a preset rule, the timing advance based on the ephemeris information and location information of the terminal device includes: The terminal device determines the timing advance based on the first horizontal distance, the first vertical distance, a horizontal positioning error of the terminal device, a vertical positioning error of the terminal device, a horizontal ephemeris error of the satellite, and a vertical ephemeris error of the satellite, where the positioning error includes the horizontal positioning error of the terminal device and the vertical positioning error of the terminal device, and the ephemeris error includes the horizontal ephemeris error of the satellite and the vertical ephemeris error of the satellite. The preset rule specifically includes: $TA=2\sqrt{(H-D_v-E_v)^2+(S-D_h-E_h)^2}/c$, where TA represents the timing advance, H represents the first vertical distance, S represents the first horizontal distance, $D_v$ represents the vertical positioning error of the terminal device, $D_h$ represents the horizontal positioning error of the terminal device, $E_v$ represents the vertical ephemeris error of the satellite, $E_h$ represents the horizontal ephemeris error of the satellite, and c represents the light speed constant.

In this embodiment of this application, because the vertical positioning error of the terminal device, the horizontal positioning error of the terminal device, the horizontal ephemeris error of the satellite, and the vertical ephemeris error of the satellite are considered in the process of determining the timing advance, the timing advance determined according to the preset rule is closer to an actual delay situation, and it is ensured that the random access preamble sent by the terminal device by using the using timing advance can reach the satellite within a correct time period.

In a possible implementation of the first aspect, that the terminal device determines, according to a preset rule, the timing advance based on the ephemeris information and location information of the terminal device includes: The terminal device determines the timing advance based on the first horizontal distance, the first vertical distance, a horizontal positioning error of the terminal device, and a first ephemeris error of the satellite, where the positioning error includes the horizontal positioning error of the terminal device, and the ephemeris error includes the first ephemeris error of the satellite. The preset rule specifically includes: $TA=2(\sqrt{H^2+S^2-D_h})^2-E)/c$, where TA represents the timing advance, H represents the first vertical distance, S represents the first horizontal distance, $D_h$ represents the horizontal positioning error of the terminal device, E represents the first ephemeris error of the satellite, and c represents the light speed constant.

In this embodiment of this application, the method for determining the timing advance when the terminal device has only a two-dimensional positioning capability is provided. In addition, because the horizontal positioning error of the terminal device and the ephemeris error of the satellite are considered in the process of determining the timing advance, the timing advance determined according to the preset rule is closer to an actual delay situation, and it is ensured that the random access preamble sent by the terminal device by using the using timing advance can reach the satellite within a correct time period.

In a possible implementation of the first aspect, after the terminal device determines the timing advance according to the preset rule, the method further includes:

The terminal device obtains a common timing advance, where the common timing advance is sent by the satellite, the common timing advance is determined based on a distance between a reference point of the common timing advance and the satellite, and the reference point of the common timing advance is a point that is in a cell corresponding to the reference point and that is closest to the satellite. Generally, a selected reference point is a position that is in an area covered by a beam and that is closest to a sub-satellite point.

The terminal device determines a using timing advance of the terminal device based on the common timing advance and the timing advance.

If the common timing advance is greater than the timing advance, the terminal device determines that the common timing advance is the using timing advance.

If the common timing advance is less than or equal to the timing advance, the terminal device determines that the timing advance is the using timing advance.

In this embodiment of this application, the timing advance determined according to the preset rule is compared with the common timing advance, to determine the using timing advance. This avoids using a determined timing advance with a relatively large error. It is ensured that the random access preamble sent by the terminal device by using the using timing advance can reach the satellite within the correct time period.

In a possible implementation of the first aspect, that a terminal device obtains ephemeris information of a satellite includes: The terminal device obtains the coordinates of the satellite, the ephemeris error of the satellite, and the common timing advance of the satellite.

According to a second aspect, a terminal device is provided, configured to perform the method according to any one of the first aspect or the possible implementations of the first aspect. Specifically, the terminal device includes modules configured to perform the method according to any one of the first aspect or the possible implementations of the first aspect.

According to a third aspect, an embodiment of this application provides a terminal device. The terminal device may include a processor, a memory, and an input/output (I/O) interface, where the memory stores program instructions, the processor is configured to execute the program instructions stored in the memory, so that the terminal device is enabled to perform the method for determining a timing advance according to any one of the first aspect or the possible implementations of the first aspect.

According to a fourth aspect, an embodiment of this application provides a computer-readable storage medium. The computer-readable storage medium stores instructions, and when the instructions are run on a computer, the computer is enabled to perform the method for determining a timing advance according to any one of the first aspect or the possible implementations of the first aspect.

According to a fifth aspect, an embodiment of this application provides a computer program product including instructions. When the computer program product runs on a computer, the computer is enabled to perform the method for determining a timing advance according to any one of the first aspect or the possible implementations of the first aspect.

According to a sixth aspect, this application provides a chip system. The chip system includes a processor, configured to support a terminal device to implement functions according to the first aspect; or configured to support a satellite to implement the functions according to the first aspect, for example, sending or processing data and/or information in the foregoing method. In a possible design, the chip system further includes a memory, where the memory is configured to store program instructions and data that are necessary for the satellite or the terminal device. The chip system may include a chip, or may include a chip and another discrete component. The chip system may further include an interface, configured to send and receive data.

According to a seventh aspect, an embodiment of this application provides a communication apparatus. The communication apparatus may include an entity, for example, a terminal device or a chip; and the communication apparatus includes a processor and a memory, where the memory is configured to store instructions, the processor is configured to execute the instructions in the memory, so that the communication apparatus is enabled to perform the method for determining a timing advance according to any one of the first aspect or the possible implementations of the first aspect.

It can be learned from the foregoing technical solutions that the embodiments of this application have the following advantages.

The first horizontal distance between the terminal device and the satellite and the first vertical distance between the terminal device and the satellite are calculated based on the coordinates of the terminal device and the coordinates of the satellite. The timing advance is determined based on the first horizontal distance, the first vertical distance, the ephemeris error, and the positioning error. Because the positioning error of the terminal device and the ephemeris error of the satellite are considered in the process of determining the timing advance, the random access preamble sent by the terminal device by using the timing advance is prevented from arriving at the satellite in advance. This avoids the intersymbol interference generated in the subsequent random access process.

DESCRIPTION OF EMBODIMENTS

Embodiments of this application provide a method and a related device for determining a timing advance. Because a positioning error of a terminal device and an ephemeris (ephemeris) error of a satellite are considered in a process of determining the timing advance, a random access preamble sent by the terminal device by using the timing advance is prevented from arriving at the satellite in advance. This avoids intersymbol interference generated in a subsequent random access process.

To make a person skilled in the art understand technical solutions in this application better, the following describes the technical solutions in the embodiments of this application with reference to accompanying drawings in the embodiments of this application.

Figure 1:
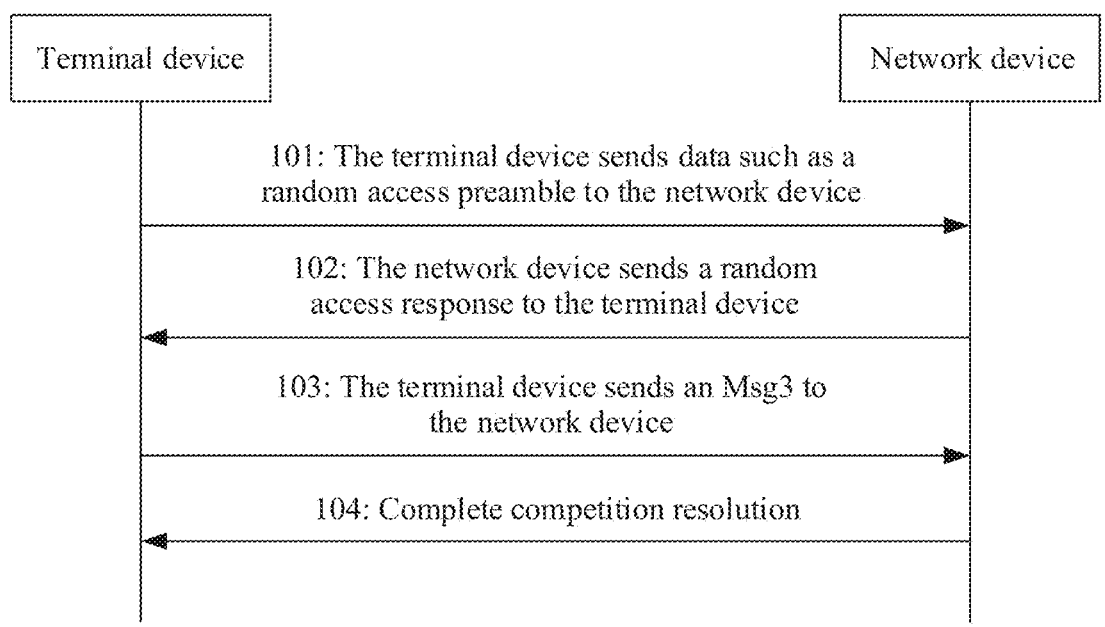
FIG. 1 is a schematic diagram of random access.

First, a random access process is described. FIG. 1 is a schematic diagram of random access.

101: A terminal device sends data such as a random access preamble to a network device.

In step 101, the terminal device selects the random access preamble (random access preamble) and a physical random access channel (physical random access channel, PRACH) resource, and sends the selected random access preamble to the network device by using the PRACH resource. In addition to the random access preamble, data such as an identifier of the terminal device (namely, a UE ID) and a small data packet is also sent. The terminal device determines the random access preamble (random access preamble) and the physical random access channel (physical random access channel, PRACH) resource, and sends the selected random access preamble to the network device by using the PRACH resource.

102: The network device sends a random access response to the terminal device.

In step 102, the network device sends the random access response (random access response, RAR) to the terminal device.

The network device receives the random access preamble, and sends the random access response (Random Access Response, RAR) to the terminal device. The RAR carries a timing advance (timing advance, TA), and the timing advance is obtained by the network device by detecting the random access preamble. The terminal device adjusts uplink timing by using the TA. A signaling length of the TA is 12 bits, and may represent (0, 1, 2, . . . , and 3846). An adjustment value that may be represented by the TA is TA=TA×16×64/($2^\mu$×480×$10^3$×4096). When a subcarrier width is 15 kHz, the TA may represent a maximum length of 2 milliseconds, and can represent only a positive value.

The random access response further includes a cell radio network temporary identifier (cell radio network temporary identifier, C-RNTI) or a temporary cell radio network temporary identifier (temporary cell radio network temporary identifier, TC-RNTI) allocated by the network device. The random access response includes one or more types of information such as the timing advance, power control information, and time and frequency resource configuration.

103: The terminal device sends an Msg3 to the network device.

In step 103, the terminal device sends the Msg3 (First scheduled UL transmission on UL-SCH) to the network device. The terminal device adjusts the uplink timing based on the timing advance in the random access response, and transmits the Msg3 in an uplink resource allocated by the network device to the terminal device, to perform subsequent data transmission.

The Msg3 may carry a radio resource control connection request (radio resource control connection request), or may carry a radio resource control connection re-establishment request (radio resource control connection re-establishment request). The Msg3 carries a contention resolution identity of the terminal device (UE contention resolution identity), to complete final contention resolution.

104: Complete the competition resolution.

In step 104, the network device delivers an Msg4 to the terminal device. The terminal device completes the contention resolution based on the Msg4.

In a non-terrestrial network (non-terrestrial networks, NTN), because a distance between a satellite used as a network device and the terminal device is relatively large, a delay between the satellite and the terminal device is relatively high. To align timing of uplink data with timing of downlink data, the timing advance needs to be used when the terminal device sends the random access preamble.

Figure 2:
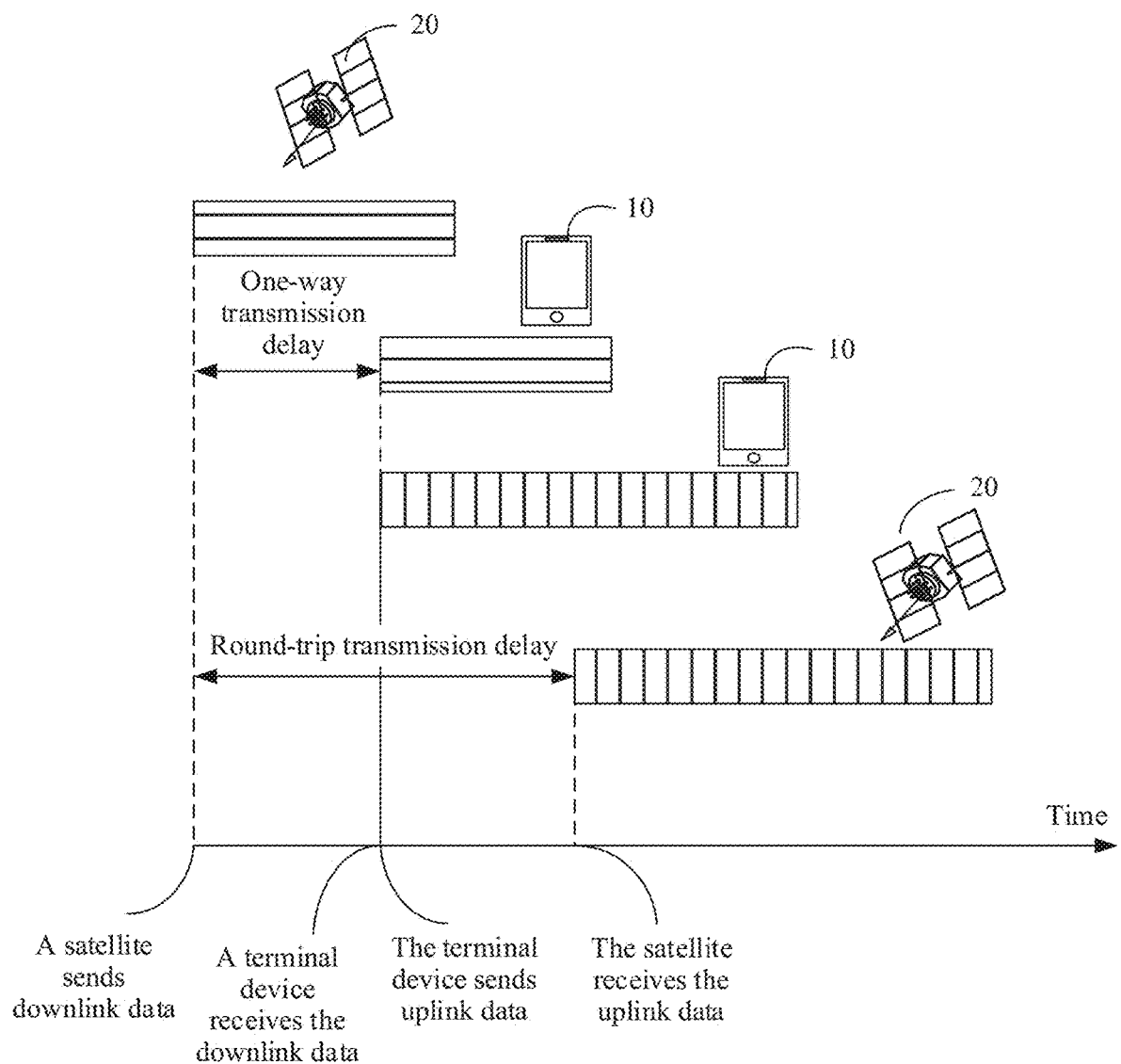
FIG. 2 is a schematic diagram of a relationship between a timing advance and a round-trip delay of uplink data according to an embodiment of this application.

Specifically, FIG. 2 is a schematic diagram of a relationship between a timing advance and a round-trip delay of uplink data according to an embodiment of this application. FIG. 2 includes a terminal device 10 and a satellite 20. The satellite 20 is used as a network device to provide a communication service for the terminal device. It should be noted that the satellite 20 used as the network device in this embodiment of this application and subsequent embodiments is merely an implementation of the network device, and the network device may alternatively be in another form. For example, the network device is an airship, a balloon, an aircraft, or a ship. This is not limited herein.

A horizontal line box indicates a time period occupied by the satellite 20 to send downlink data, and a vertical line box indicates a time period occupied by the terminal device 10 to send uplink data. A one-way transmission delay is between a moment at which the satellite 20 sends the downlink data and a moment at which the terminal device 10 receives the downlink data. A one-way transmission delay is also between a moment at which the terminal device 10 sends the uplink data and a moment at which the satellite 20 receives the uplink data. Therefore, a round-trip transmission delay is between the moment at which the satellite 20 sends the downlink data and the moment at which the satellite 20 receives the uplink data. Because a distance between the satellite 20 and the terminal device 10 is relatively large, the round-trip transmission delay between the satellite 20 and the terminal device 10 is relatively high.

To resolve a problem that the round-trip transmission delay between the satellite and the terminal device is relatively high, in a solution in the conventional technology, before initial random access, the terminal device may obtain the timing advance used by the terminal device in two manners.

Figure 3A:
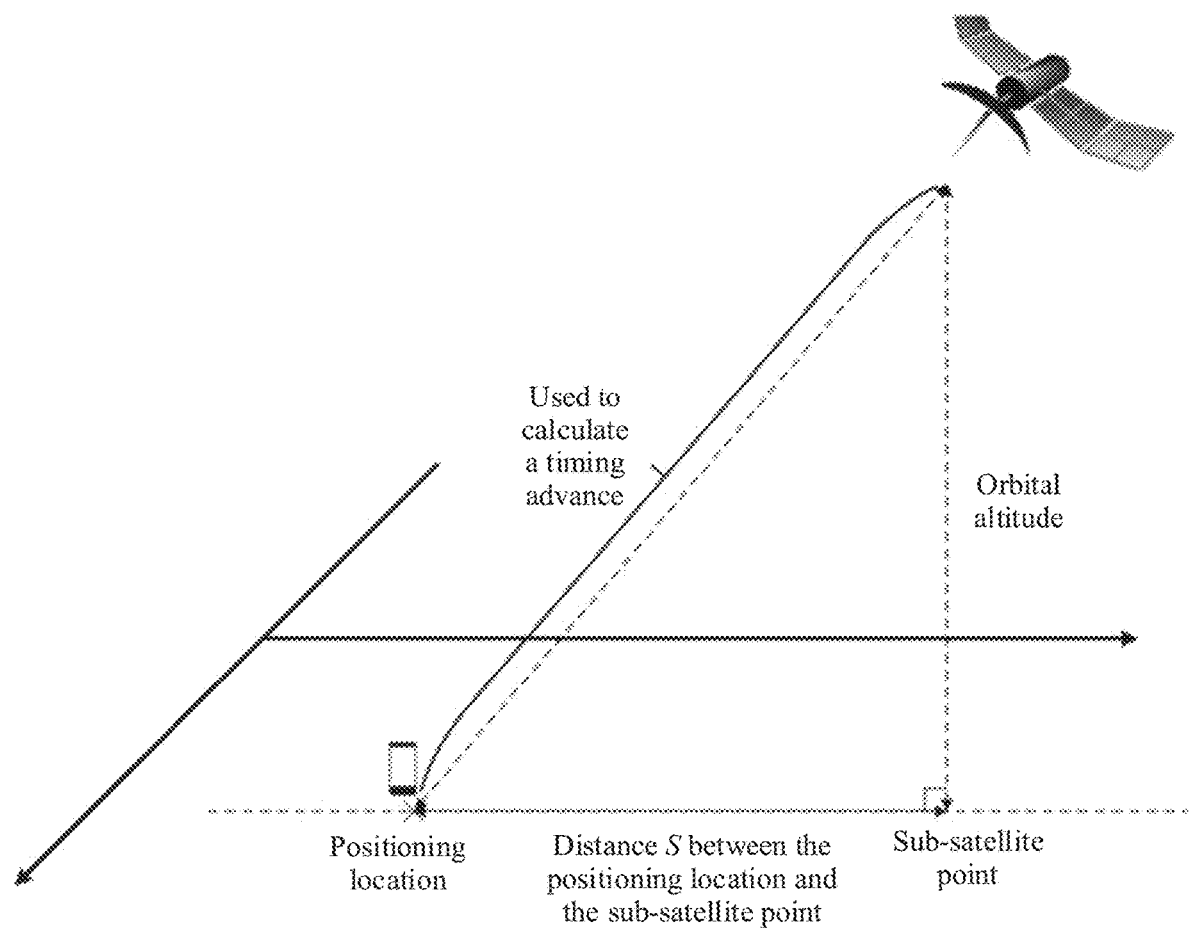
FIG. 3A is a schematic diagram of determining a timing advance by a terminal device according to an embodiment of this application.

In a first manner, the terminal device determines the timing advance based on location information for positioning of the terminal device and ephemeris information of the satellite. FIG. 3A is a schematic diagram of determining a timing advance by a terminal device according to an embodiment of this application. The ephemeris information of the satellite includes a sub-satellite point of the satellite (the sub-satellite point is an intersection point of a line connecting the Earth's center and the satellite on the Earth's surface, and is represented in geographic longitude and latitude, where a ground point directly below the satellite is called the sub-satellite point), and an orbital altitude of the satellite. Specifically, the timing advance is determined based on a distance (S) between a positioning location of the terminal device and the sub-satellite point of the satellite, and the orbital altitude of the satellite.

Figure 3B:
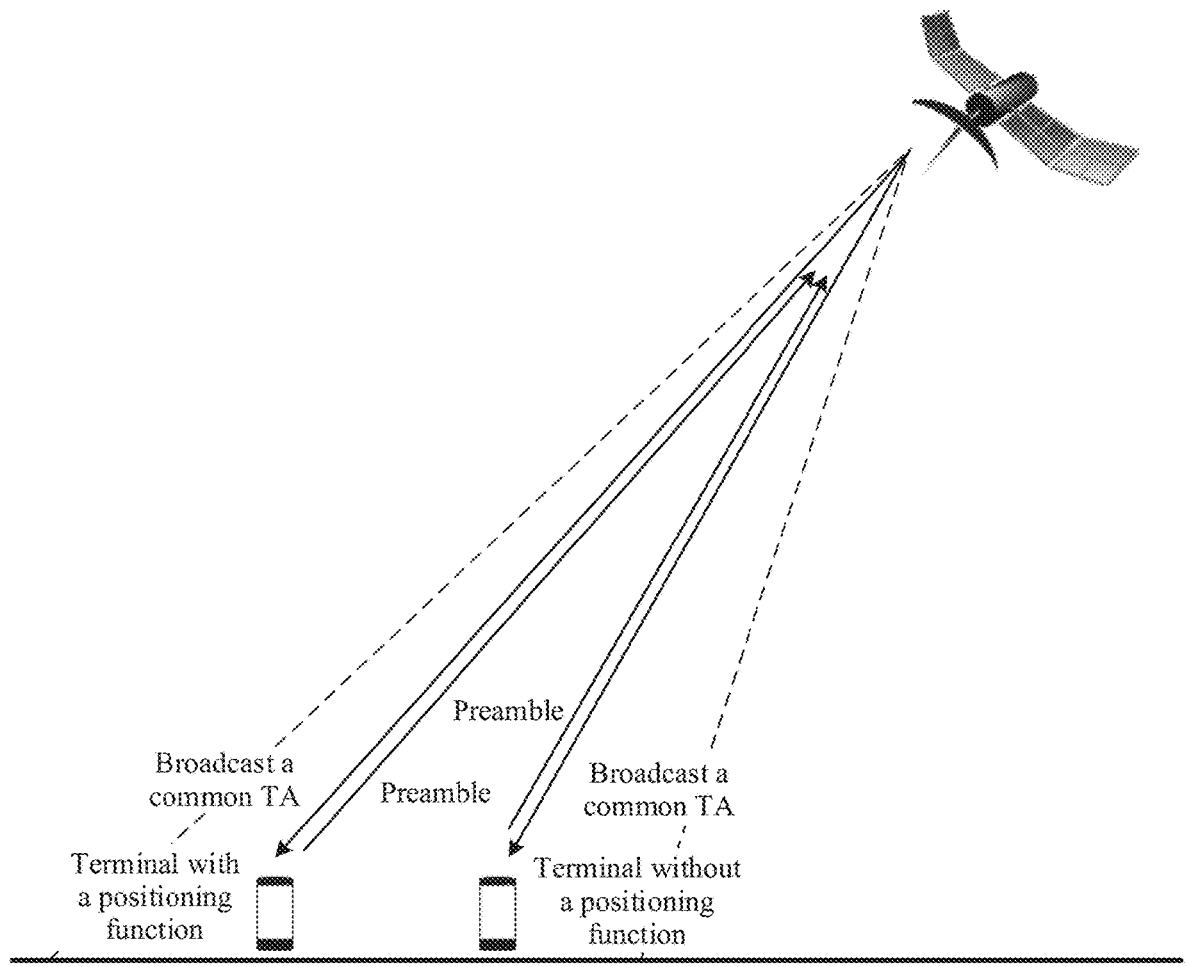
FIG. 3B is a schematic diagram of broadcasting a common timing advance by a satellite according to an embodiment of this application.

In a second manner, the terminal device determines the timing advance based on a currently-broadcast common timing advance (common TA), where the common timing advance is broadcast by the satellite. FIG. 3B is a schematic diagram of broadcasting a common timing advance by a satellite according to an embodiment of this application. The common timing advance is determined based on a round-trip delay from the satellite to a center location of a beam, or a round-trip delay from the satellite to a point closest to a beam. The beam is sent by the satellite, and an area covered by the beam is a cell for which the satellite provides a service.

Figure 4:
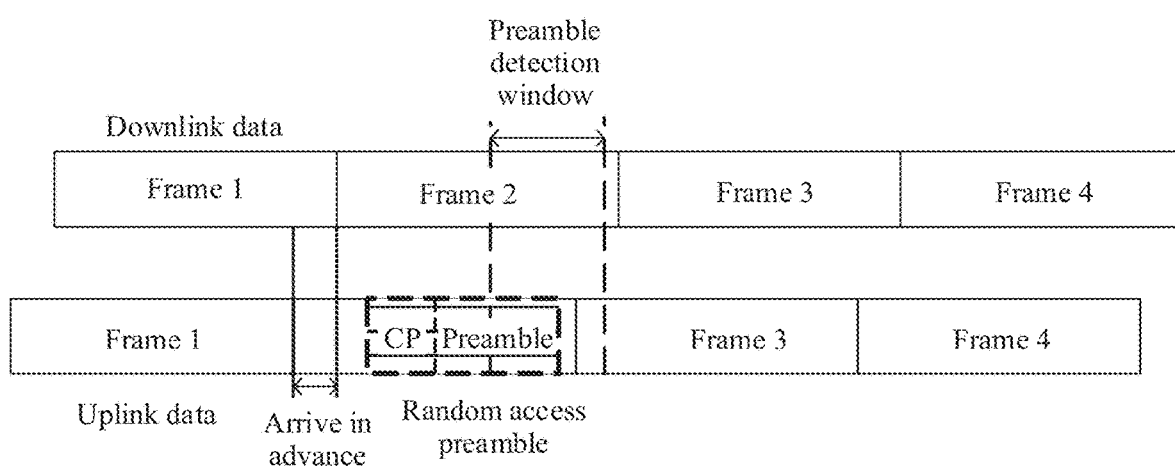
FIG. 4 is a schematic diagram in which a random access preamble arrives in advance according to an embodiment of this application.

In the foregoing two methods, after obtaining the timing advance, the terminal device sends the random access preamble by using the timing advance. Because the terminal device has a positioning error and the satellite has an ephemeris error, in comparison with an ideal case, the random access preamble sent by the terminal device usually arrives in advance. The ideal case is that a time period occupied by the random access preamble sent by the terminal device by using the timing advance is consistent with a time period occupied by the network device to detect a preamble detection window of the random access preamble. Specifically, FIG. 4 is a schematic diagram in which a random access preamble arrives in advance according to an embodiment of this application. When the random access preamble arrives at the satellite in advance, intersymbol interference is generated in a subsequent random access process. In this case, to enable the satellite to completely receive the random access preamble sent by the terminal device, the time period occupied by the preamble detection window needs to be prolonged. This further causes a problem that transmission efficiency is reduced.

Based on the foregoing technical defects, this application provides a method and a related device for determining a timing advance. The following further describes the technical solutions of this application by using embodiments.

Figure 5A:
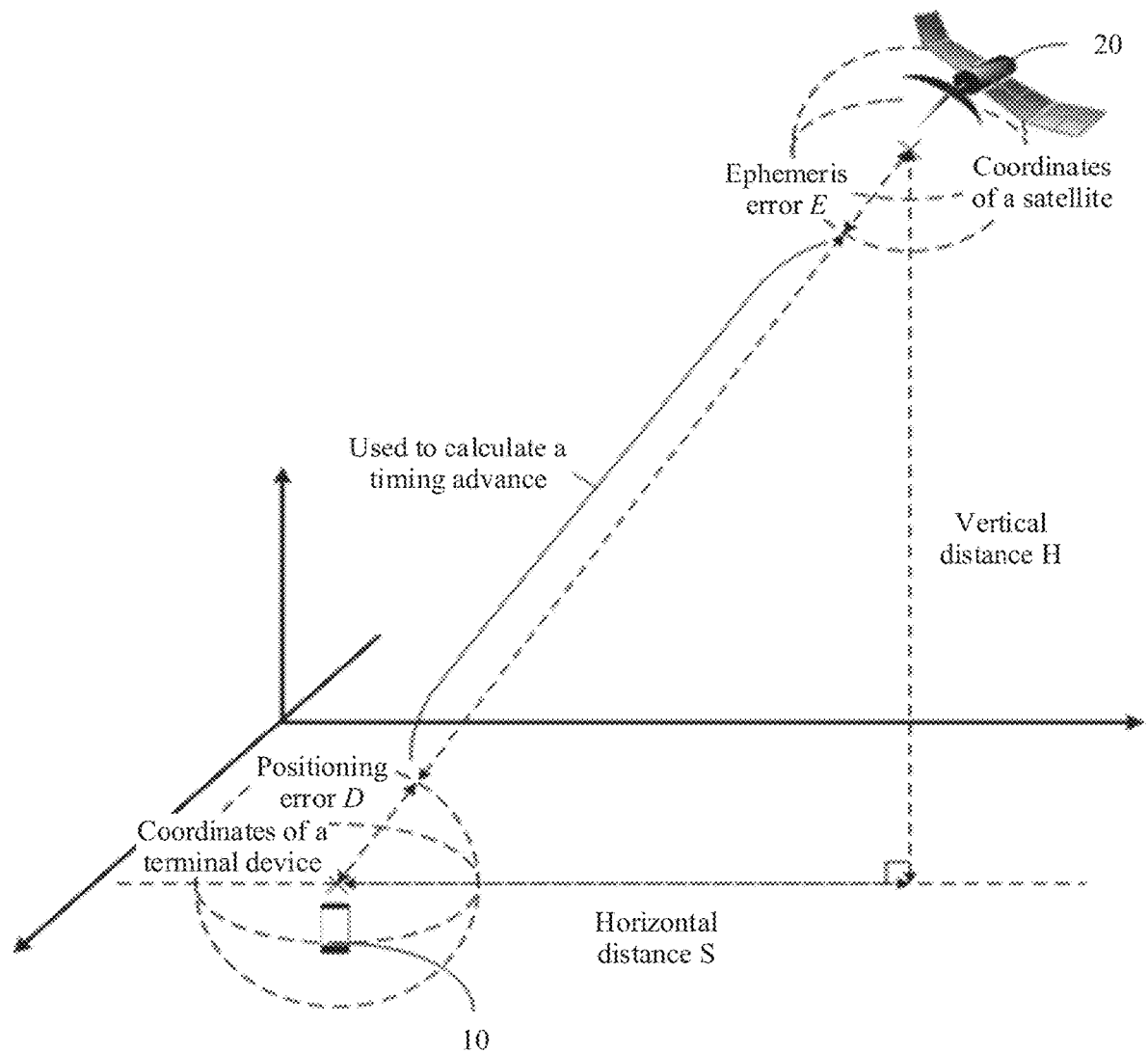
FIG. 5A is a schematic diagram of a structure of a communication system to which a method for determining a timing advance is applicable according to an embodiment of this application.

FIG. 5A is a schematic diagram of a structure of a communication system to which a method for determining a timing advance is applicable according to an embodiment of this application. As shown in FIG. 5A, coordinates of a satellite determined based on ephemeris information of the satellite 20 and an ephemeris error (E) relative to the coordinates of the satellite, coordinates of a terminal device determined based on location information of the terminal device 10 and a positioning error (D) relative to the coordinates of the terminal device, a vertical distance (H) from the coordinates of the satellite to a sub-satellite point learned based on the ephemeris information, and a horizontal distance (S) from the terminal device 10 to the sub-satellite point determined based on the ephemeris information and the location information of the terminal device 10 are used to calculate a timing advance of the terminal device 10. Because the positioning error of the terminal device and the ephemeris error of the satellite are considered in a process of determining the timing advance, a random access preamble sent by the terminal device by using the timing advance is prevented from arriving at the satellite in advance. This avoids intersymbol interference generated in a subsequent random access process.

The communication system shown in FIG. 5A may be a base station access system of a 4G network, or may be a base station access system of a 5G network. The communication system includes one or more network devices and one or more terminal devices. FIG. 5A is used as an example. In an optional implementation, the network device is the satellite 20, the terminal device is the terminal device 10, and the satellite 20 provides a communication service for the terminal device 10. In another optional implementation, the network device is the satellite 20, the terminal device 10 is also a network device, the satellite 20 provides a communication service for the terminal device 10, and the terminal device 10 is used as a relay to provide the communication service for another terminal device connected to the terminal device 10. This is not limited herein.

In the following implementation, the network device is the satellite 20, the terminal device 10 is also the network device, the satellite 20 provides the communication service for the terminal device 10, and the terminal device 10 is used as the relay to provide the communication service for the another terminal device connected to the terminal device 10. The network device used as the terminal device 10 may be any device with a wireless transceiver function, or a chip disposed in a device with a specific wireless transceiver function. The network device includes but is not limited to a base station (for example, a base station (BS), a NodeB (NodeB), an evolved NodeB (eNodeB or eNB), a gNodeB or gNB in a fifth generation 5G communication system, a base station in a future communication system, an access node in a Wi-Fi system, a wireless relay node, or a wireless backhaul node), and the like. The base station may be a macro base station, a micro base station, a picocell base station, a small cell, a relay station, or the like. A plurality of base stations may support a network of one or more of the foregoing technologies, or a future evolved network. The core network may support a network of one or more of the foregoing technologies, or a future evolved network. The base station may include one or more co-site or non-co-site transmission reception points (transmission reception point, TRP). Alternatively, the network device may be an access controller, a centralized unit (centralized unit, CU), a distributed unit (distributed unit, DU), or the like in a cloud radio access network (cloud radio access network, CRAN) scenario. Alternatively, the network device may be a server, a wearable device, a vehicle-mounted device, or the like. The following uses an example in which the network device is the base station for description. The plurality of network devices may be base stations of a same type or base stations of different types. The base station may communicate with the terminal device, or may communicate with the terminal device by using a relay station. The terminal device may support communication with a plurality of base stations using different technologies. For example, the terminal device may support communication with a base station supporting an LTE network, may support communication with a base station supporting a 5G network, or may support a dual connection to a base station supporting an LTE network and a base station supporting a 5G network. For example, the terminal device is connected to a RAN node of a radio network. Currently, the RAN node is, for example, a gNB, a transmission reception point (transmission reception point, TRP), an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB or a home NodeB, HNB), a baseband unit (base band unit, BBU), or a wireless fidelity (wireless fidelity, Wi-Fi) access point (access point, AP). In a network structure, the network device may include a centralized unit (centralized unit, CU) node, a distributed unit (distributed unit, DU) node, or a RAN device including a CU node and a DU node.

For ease of description, the following uses an example in which the satellite 20 is the network device and the terminal device 10 is the terminal device for description.

FIG. 5A is an example of satellite communication. Certainly, the satellite communication may be used in another communication system. The communication system shown in FIG. 5A may alternatively be a mobile satellite communication system in satellite communication. In the mobile satellite communication system, the network device includes but is not limited to a non-geostationary earth orbit (non-geostationary earth orbit, NGEO) communication satellite, a device that has a wireless transceiver function in an NGEO communication satellite, or a chip disposed in a device that has a wireless transceiver function in an NGEO communication satellite.

The terminal device 10 in this embodiment of this application is also referred to as user equipment (user equipment, UE), a mobile station (mobile station, MS), a mobile terminal (mobile terminal, MT), a terminal device, or the like; and is a device that provides voice and/or data connectivity for a user, or a chip disposed in a device, for example, a handheld device having a wireless connection power permit, or a vehicle-mounted device. The terminal device may include but is not limited to a handheld device, a vehicle-mounted device, a wearable device, or a computing device that has a wireless communication function, another processing device connected to a wireless modem, a mobile phone (mobile phone), a tablet computer, a notebook computer, a palmtop computer, a mobile Internet device (mobile Internet device, MID), a machine-type communication terminal, a virtual reality (virtual reality, VR) device, an augmented reality (augmented reality, AR) device, a wireless terminal in industrial control (industrial control), a wireless terminal in self driving (self driving), a wireless terminal in a remote medical surgery (remote medical surgery), a wireless terminal in a smart grid (smart grid), a wireless terminal in transportation safety (transportation safety), a wireless terminal in a smart city (smart city), a wireless terminal in a smart home (smart home), and the like.

Figure 5B:
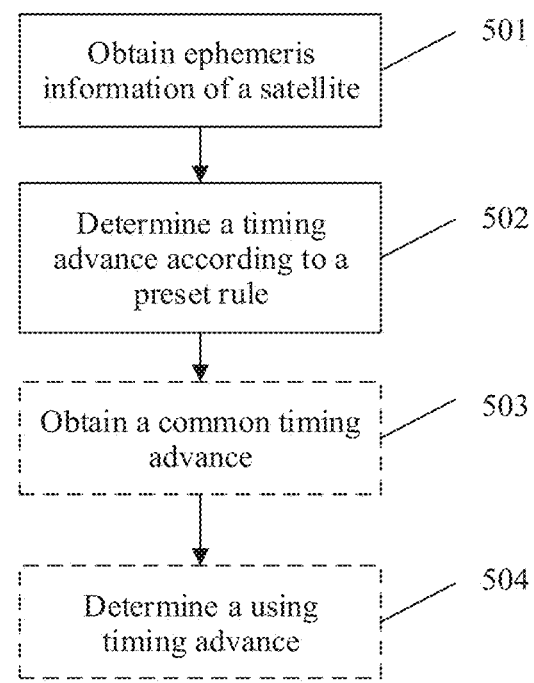
FIG. 5B is a schematic diagram of an embodiment of a method for determining a timing advance according to an embodiment of this application.

The following describes in detail the method for determining the timing advance according to an embodiment of this application with reference to the accompanying drawings. FIG. 5B is a schematic diagram of an embodiment of a method for determining a timing advance according to an embodiment of this application.

501: Obtain ephemeris information of a satellite.

In this embodiment, when a terminal device needs to access the satellite, the terminal device first obtains the ephemeris information of the satellite and location information of the terminal device.

Figure 6:
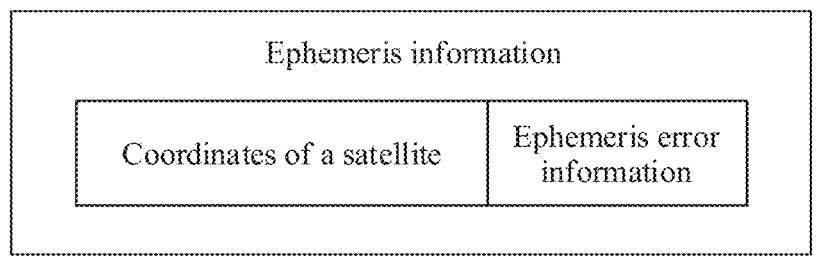
FIG. 6 is a schematic diagram of an ephemeris error according to an embodiment of this application.

The terminal device obtains the ephemeris information of the satellite. In an optional implementation, the ephemeris information is broadcast by the satellite. The terminal device obtains the ephemeris information of the satellite by receiving a broadcast message of the satellite. The ephemeris information of the satellite includes coordinates of the satellite and an ephemeris error of the satellite. In this case, FIG. 6 is a schematic diagram of an ephemeris error according to an embodiment of this application. The ephemeris error is included in the ephemeris information broadcast by the satellite; and the ephemeris error may be represented as an error in a three-dimensional direction, or may be represented as an error in a two-dimensional direction.

In another optional implementation, the ephemeris information is prestored in the terminal device or prestored in a cloud server. When the terminal device needs to access the satellite, the terminal device searches, based on coordinates of the terminal device, for a satellite that can provide a communication service for a location at which the coordinates of the terminal device are located. Further, the terminal device obtains the ephemeris information of the satellite. This is not limited herein.

The terminal device obtains the location information of the terminal device, where the location information of the terminal device includes the coordinates of the terminal device and a positioning error of the terminal device. The coordinates of the terminal device may be represented by using longitude and latitude coordinates, for example, N22°32'43.86" of north latitude, and E114°03'10.40" of east longitude.

502: Determine the timing advance according to a preset rule.

In this embodiment, after obtaining the ephemeris information of the satellite and the location information of the terminal device, the terminal device determines the timing advance according to the preset rule. Specifically, a first horizontal distance is obtained through calculation based on the coordinates of the terminal device and the coordinates of the satellite, where the first horizontal distance is a distance between a sub-satellite point of the satellite and the location of the terminal device. Then, a first vertical distance is obtained through calculation based on the coordinates of the terminal device and the coordinates of the satellite, where the first vertical distance may be an orbital altitude of the satellite, or may be a distance between an orbital altitude of the satellite and an altitude at which the terminal device is located. This is not limited herein. Then, the terminal device determines the ephemeris error of the satellite and the positioning error of the terminal device based on the ephemeris information and the location information of the terminal device.

Specifically, in a plane determined by the coordinates of the terminal device, the sub-satellite point, and the coordinates of the satellite, the terminal device may learn of, based on the ephemeris information and the positioning information of the terminal device, coordinates (x1, y1) of the satellite, where x1 represents a horizontal coordinate of the satellite, y1 indicates a vertical coordinate of the satellite; and coordinates (x2, y2) of the terminal device, where x2 represents a horizontal coordinate of the terminal device, and y2 represents a vertical coordinate of the terminal device. In this case, the first vertical distance is |y1−y2|, and the first horizontal distance is |x2−x1|.

The terminal device determines, according to the preset rule, the timing advance based on the ephemeris error, the positioning error, the first horizontal distance, and the first vertical distance. Based on different cases of the terminal device and the satellite, there are a plurality of manners for determining the timing advance, which are described in detail in subsequent embodiments.

503: Obtain a common timing advance.

In this embodiment, after determining the timing advance according to the preset rule, the terminal device further obtains the common timing advance, where the common timing advance is broadcast by the satellite. It should be noted that step 503 is an optional step, and the terminal device may directly use the timing advance determined according to the preset rule.

Figure 7:
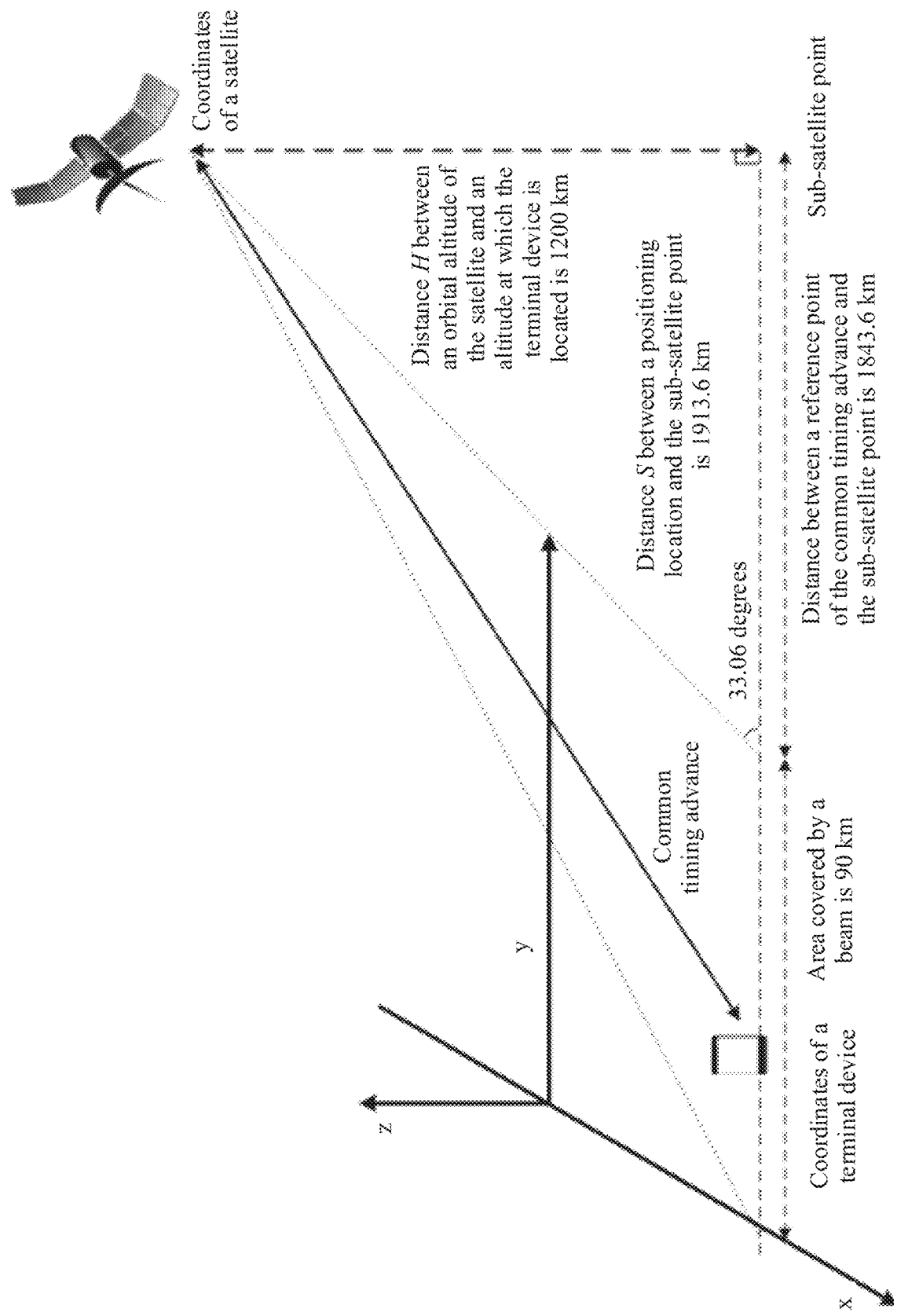
FIG. 7 is a schematic diagram of a common timing advance calculation scenario according to an embodiment of this application.

Specifically, FIG. 7 is a schematic diagram of a common timing advance calculation scenario according to an embodiment of this application. As shown in FIG. 7, it can be learned based on the ephemeris information of the satellite and the location information of the terminal device that the distance (H) between the orbital altitude of the satellite and the altitude at which the terminal device is located is 1200 kilometers (kilometer, km). An area covered by a beam of the satellite (namely, a diameter of the beam projected on the ground) is 90 km, and the distance between the sub-satellite point of the satellite and the location of the terminal device, also referred to as the first horizontal distance (S), is 1913.6 km. A specific value of the common timing advance needs to be calculated based on a reference point. Generally, a selected reference point is a location that is in the area covered by the beam and that is closest to the sub-satellite point. In FIG. 7, a distance between the reference point of the common timing advance and the sub-satellite point of the satellite is 1843.6 km. An angle between a horizontal plane in which the reference point is located and the satellite is 33.06 degrees (degree). Therefore, the common timing advance may be calculated by using the following methods:

$$\text{TA\_common} = 2\left(\sqrt{1200^2 + 1843.6^2}\right)/c; \text{ and}$$

$$\text{TA\_common} = 14.67\,\text{ms,}$$

where

TA_common is the common timing advance, and c is the light speed constant. It may be learned according to the formulas that, in a scenario corresponding to FIG. 7, the common timing advance is 14.67 milliseconds (millisecond, ms).

504: Determine a using timing advance.

In this embodiment, after determining the timing advance and obtaining the common timing advance, the terminal device determines the using timing advance based on the timing advance and the common timing advance. It should be noted that, for a terminal device without a positioning function, the terminal device directly determines the common timing advance as the using timing advance. Step 504 is an optional step. When step 503 is not performed, the terminal device directly uses the timing advance determined according to the preset rule. Therefore, step 504 is also not performed.

Specifically, if the common timing advance is greater than the timing advance, it is determined that the common timing advance is the using timing advance. If the common timing advance is less than or equal to the timing advance, it is determined that the timing advance is the using timing advance. The following provides detailed description.

The common timing advance is determined based on the distance between the reference point of the common timing advance and the satellite, where the reference point of the common timing advance is a point that is in a cell corresponding to the reference point and that is closest to the satellite. When the determined timing advance is less than the common timing advance, the location of the terminal device corresponding to the determined timing advance is closer than the reference point of the common timing advance. Therefore, this case is inconsistent with an actual situation, and an error exists. In this case, the common timing advance is selected as the using timing advance of the terminal device.

However, when the determined timing advance is greater than or equal to the common timing advance, the location of the terminal device corresponding to the determined timing advance is in the cell corresponding to the determined reference point of the common timing advance, and belongs to a proper range. Therefore, the determined timing advance is selected as the using timing advance of the terminal device.

In this embodiment of this application, because the positioning error of the terminal device and the ephemeris (ephemeris) error of the satellite are considered in a process of determining the timing advance, a random access preamble sent by the terminal device by using the timing advance is prevented from arriving at the satellite in advance. This avoids intersymbol interference generated in a subsequent random access process. In addition, the timing advance determined according to the preset rule is compared with the common timing advance, to determine the using timing advance. This avoids using a determined timing advance with a relatively large error. It is ensured that the random access preamble sent by the terminal device by using the using timing advance can reach the satellite within a correct time period.

Based on the embodiment corresponding to FIG. 5, the following describes in detail how to determine the timing advance according to the preset rule.

Figure 8:
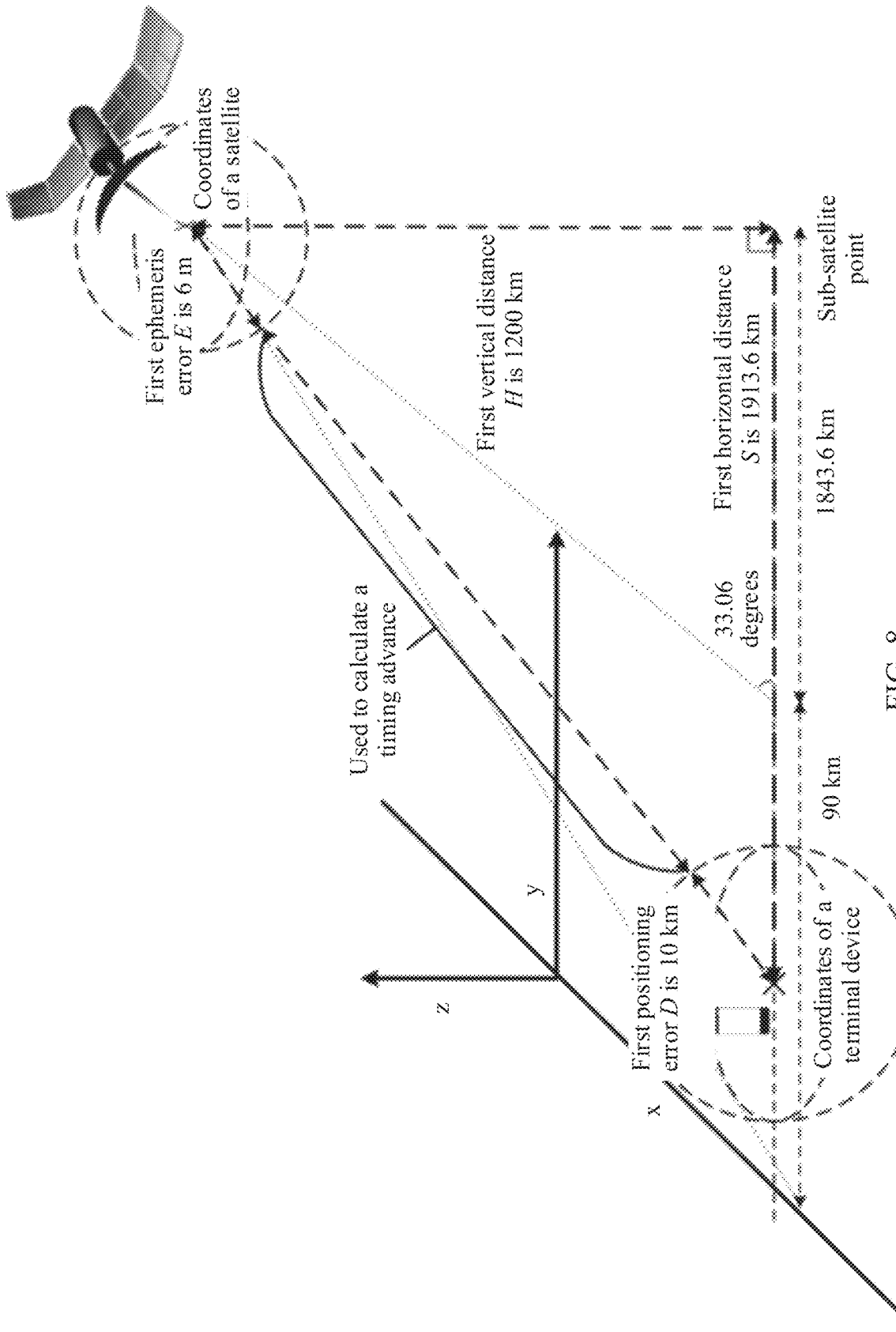
FIG. 8 is a schematic diagram of another embodiment of a method for determining a timing advance according to an embodiment of this application.

First, a case in which a range of the positioning error of the terminal device is a sphere and a range of the ephemeris error of the satellite is a sphere is described. FIG. 8 is a schematic diagram of another embodiment of a method for determining a timing advance according to an embodiment of this application.

A scenario in which the distance between the location of the satellite and the altitude in which the terminal device is located is 1200 kilometers, in other words, the first vertical distance (H) is 1200 kilometers; the distance between the sub-satellite point of the satellite and the terminal device is 1913.6 kilometers, in other words, the first horizontal distance (S) is 1913.6 kilometers; a first ephemeris error (E) of the satellite is 6 meters; and a first positioning error (D) of the terminal device is 10 kilometers is used as an example for description.

To consider the positioning error of the terminal device and the ephemeris error of the satellite in the process of determining the timing advance, a distance selected when the timing advance is determined is a distance between the terminal device and the satellite minus the positioning error and then minus the ephemeris error. In a scenario corresponding to FIG. 8, the terminal device may exist at any point in a sphere formed by using the coordinates of the terminal device as the center of the sphere and the first positioning error as the radius. The satellite may exist at any point in a sphere formed by using the coordinates of the satellite as the center of the sphere and the first ephemeris error as the radius. Therefore, the distance selected when the timing advance is determined is actually a connection line between a point at which the coordinates of the terminal device are located and a point at which the coordinates of the satellite are located. A distance between intersection points of the connection line and the two spheres is a shortest distance between the two spheres.

Specifically, the timing advance is determined by using the following method:

$$TA = 2(\sqrt{H^2 + S^2} - D - E)/c,$$

where

TA represents the timing advance, H represents the first vertical distance, S represents the first horizontal distance, D represents the first positioning error of the terminal device, E represents the first ephemeris error of the satellite, and c represents the light speed constant.

In the scenario corresponding to FIG. 8, a specific calculation process is as follows:

$$TA = 2(\sqrt{H^2 + S^2} - D - E)/c;$$

$$TA = 2(\sqrt{1200^2 + 1913.6^2} - 0.006 - 10)/3*10^5; \text{ and}$$

$$TA = 0.01499.$$

In this embodiment of this application, because the positioning error of the terminal device and the ephemeris error of the satellite are considered in the process of determining the timing advance, the timing advance determined according to the preset rule is closer to an actual delay situation, and it is ensured that the random access preamble sent by the terminal device by using the using timing advance can reach the satellite within a correct time period.

Second, a case in which the range of the positioning error of the terminal device is a cylinder and the range of the ephemeris error of the satellite is a sphere is described. In this case, the positioning error of the terminal device includes a horizontal positioning error and a vertical positioning error.

Figure 9:
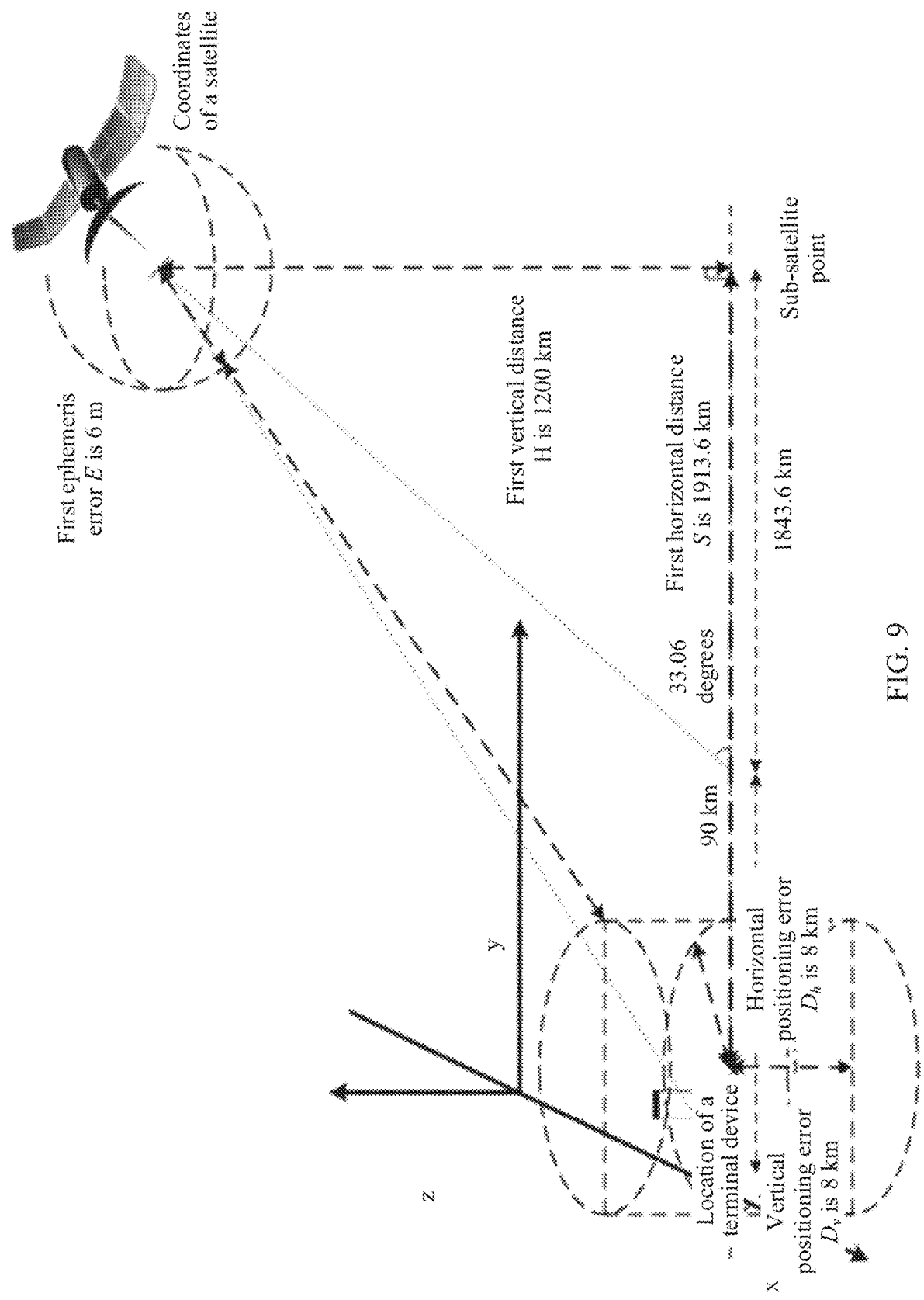
FIG. 9 is a schematic diagram of another embodiment of a method for determining a timing advance according to an embodiment of this application.

FIG. 9 is a schematic diagram of another embodiment of a method for determining a timing advance according to an embodiment of this application.

A scenario in which the distance between the location of the satellite and the altitude in which the terminal device is located is 1200 kilometers, in other words, the first vertical distance (H) is 1200 kilometers; the distance between the sub-satellite point of the satellite and the terminal device is 1913.6 kilometers, in other words, the first horizontal distance (S) is 1913.6 kilometers; the first ephemeris error (E)

of the satellite is 6 meters; the vertical positioning error ($D_v$) of the terminal device is 8 kilometers; and the horizontal positioning error ($D_h$) of the terminal device is 8 kilometers is used as an example for description.

To consider the positioning error of the terminal device and the ephemeris error of the satellite in the process of determining the timing advance, the distance selected when the timing advance is determined is the distance between the terminal device and the satellite minus the positioning error and then minus the ephemeris error. In a scenario corresponding to FIG. 9, the terminal device may exist at any point in a cylinder formed by using the coordinates of the terminal device as the center of the cylinder, the horizontal positioning error as the radius, and a 2-times vertical positioning error as the height (the cylinder uses a vertical coordinate of the terminal device as a zero point, a vertical coordinate of the top of the cylinder is y1+$D_v$, and a vertical coordinate of the bottom of the cylinder is y1−$D_v$). The satellite may exist at any point in a sphere formed by using the coordinates of the satellite as the center of the sphere and the first ephemeris error as the radius.

As shown in FIG. 9, a plane is determined based on a connection line between the sub-satellite point and the coordinates of the satellite, and a connection line between the coordinates of the terminal device and the sub-satellite point. In the plane, a cross section of the cylinder in which the terminal device is located is a rectangle; and in the plane, a cross section of the sphere in which the satellite is located is a circle. A shortest distance between the rectangle and the circle is a distance between a point that is in end points of the rectangle and that is closest to the coordinates of the satellite and the center of the circle minus the first ephemeris error (the radius of the circle). A specific calculation method is as follows:

$$TA = 2\left(\sqrt{(H-D_V)^2 + (S-D_h)^2} - E\right)/c;$$

$$TA = 2\left(\sqrt{(1200-8)^2 + (1913.6-8)^2} - 0.006\right)/3*10^5; \text{ and}$$

$$TA = 0.01498,$$

where

TA represents the timing advance, H represents the first vertical distance, S represents the first horizontal distance, $D_v$ represents the vertical positioning error of the terminal device, $D_h$ represents the horizontal positioning error of the terminal device, E represents the first ephemeris error of the satellite, and c represents the light speed constant.

In this embodiment of this application, because the vertical positioning error of the terminal device, the horizontal positioning error of the terminal device, and the ephemeris error of the satellite are considered in the process of determining the timing advance, the timing advance determined according to the preset rule is closer to an actual delay situation, and it is ensured that the random access preamble sent by the terminal device by using the using timing advance can reach the satellite within a correct time period.

Third, a case in which the range of the positioning error of the terminal device is a cylinder and the range of the ephemeris error of the satellite is a cylinder is described. In this case, the positioning error of the terminal device includes the horizontal positioning error and the vertical positioning error, and the satellite ephemeris error includes a horizontal ephemeris error and a vertical ephemeris error.

Figure 10:
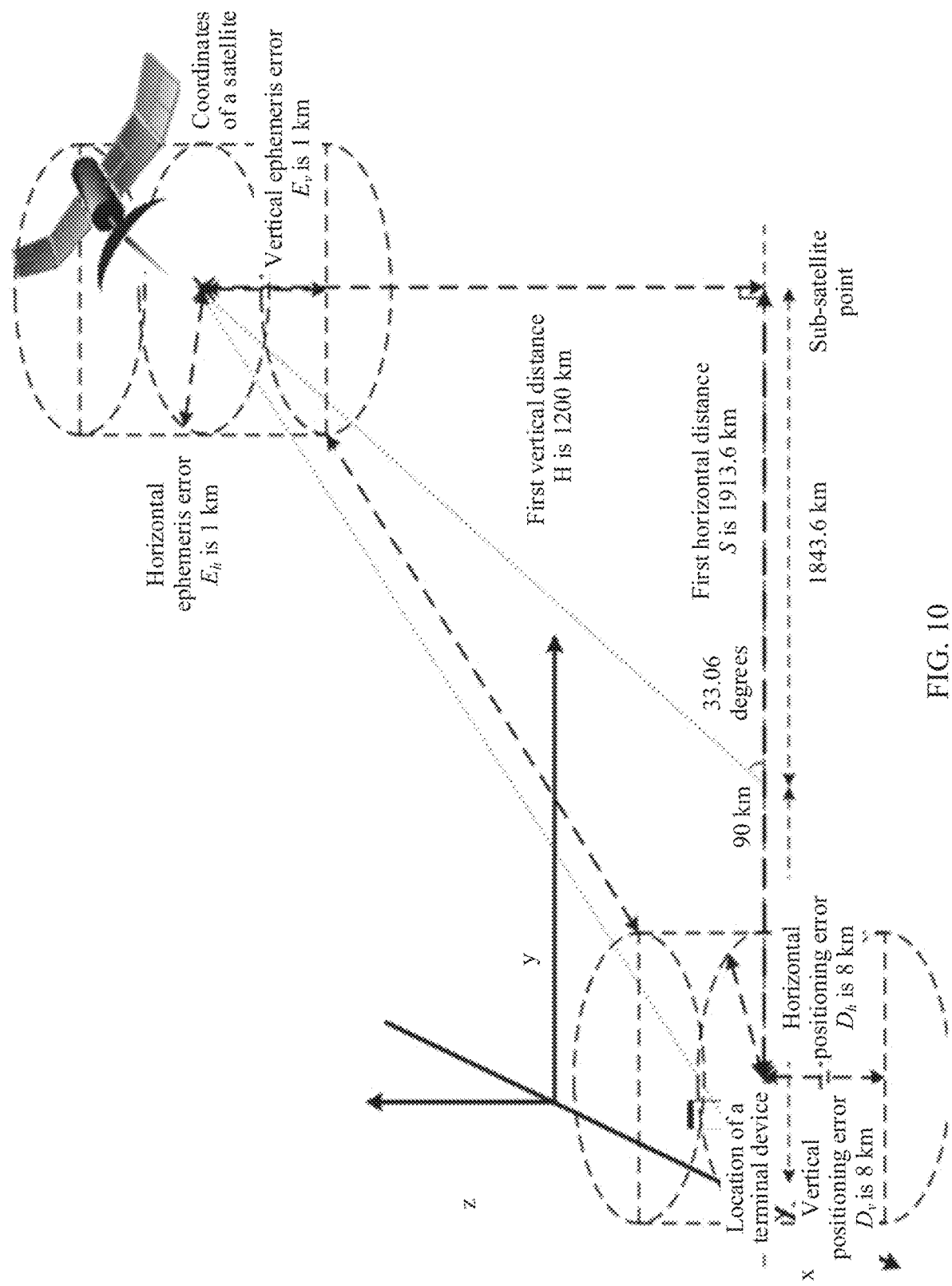
FIG. 10 is a schematic diagram of another embodiment of a method for determining a timing advance according to an embodiment of this application.

FIG. 10 is a schematic diagram of another embodiment of a method for determining a timing advance according to an embodiment of this application.

A scenario in which the distance between the location of the satellite and the altitude in which the terminal device is located is 1200 kilometers, in other words, the first vertical distance (H) is 1200 kilometers; the distance between the sub-satellite point of the satellite and the terminal device is 1913.6 kilometers, in other words, the first horizontal distance (S) is 1913.6 kilometers; the horizontal ephemeris error ($E_h$) of the satellite is 1 kilometer; the vertical ephemeris error ($E_v$) of the satellite is 1 kilometer; the vertical positioning error ($D_v$) of the terminal device is 8 kilometers; and the horizontal positioning error ($D_h$) of the terminal device is 8 kilometers is used as an example for description.

To consider the positioning error of the terminal device and the ephemeris error of the satellite in the process of determining the timing advance, the distance selected when the timing advance is determined is the distance between the terminal device and the satellite minus the positioning error and then minus the ephemeris error. In a scenario corresponding to FIG. 10, the terminal device may exist at any point in a cylinder formed by using the coordinates of the terminal device as the center of the cylinder, the horizontal positioning error as the radius, and the 2-times vertical positioning error as the height (the cylinder uses the vertical coordinate of the terminal device as a zero point, a vertical coordinate of the top of the cylinder is y1+$D_v$, and a vertical coordinate of the bottom of the cylinder is y1−$D_v$). The satellite may exist at any point in a cylinder formed by using the coordinates of the satellite as the center of the cylinder, the horizontal ephemeris error as the radius, and the 2-times vertical ephemeris error as the height (the cylinder uses the vertical coordinate of the satellite as a zero point, a vertical coordinate of the top of the cylinder is y2+$E_v$, and a vertical coordinate of the bottom of the cylinder is y2−$E_v$).

As shown in FIG. 10, a plane is determined based on a connection between the sub-satellite point and the coordinates of the satellite, and a connection between the coordinates of the terminal device and the sub-satellite point. In the plane, a cross section of the cylinder in which the terminal device is located is a rectangle. For ease of description, the cross section of the cylinder in which the terminal device is located is referred to as a first rectangle herein. In the plane, a cross section of the cylinder in which the satellite is located is a rectangle. For ease of description, the cross section of the cylinder in which the satellite is located is referred to as a second rectangle herein.

A shortest distance between the first rectangle and the second rectangle is a connection line between a point that is in end points of the first rectangle and that is closest to the coordinates of the satellite and a point that is in end points of the second rectangle and that is closest to the coordinates of the terminal device. A specific calculation method is as follows:

$$TA = 2\left(\sqrt{(H-D_V-E_V)^2 + (S-D_h-E_h)^2}\right)/c;$$

$$TA = 2\left(\sqrt{(1200-8-1)^2 + (1913.6-8-1)^2}\right)/3*10^5; \text{ and}$$

$$TA = 0.01497,$$

where

TA represents the timing advance, H represents the first vertical distance, S represents the first horizontal distance, $D_v$ represents the vertical positioning error of the terminal device, $D_h$ represents the horizontal positioning error of the terminal device, $E_v$ represents the vertical ephemeris error of the satellite, $E_h$ represents the horizontal ephemeris error of the satellite, and c represents the light speed constant.

In this embodiment of this application, because the vertical positioning error of the terminal device, the horizontal positioning error of the terminal device, the horizontal ephemeris error of the satellite, and the vertical ephemeris error of the satellite are considered in the process of determining the timing advance, the timing advance determined according to the preset rule is closer to an actual delay situation, and it is ensured that the random access preamble sent by the terminal device by using the using timing advance can reach the satellite within a correct time period.

Then, when the terminal device has only a two-dimensional positioning capability, the coordinates obtained by the terminal device have no height information. A case in which the range of the positioning error of the terminal device is a circle and the range of the ephemeris error of the satellite is a sphere is described. In this case, the positioning error of the terminal device includes the horizontal positioning error, and the ephemeris error of the satellite includes the first ephemeris error.

Figure 11:
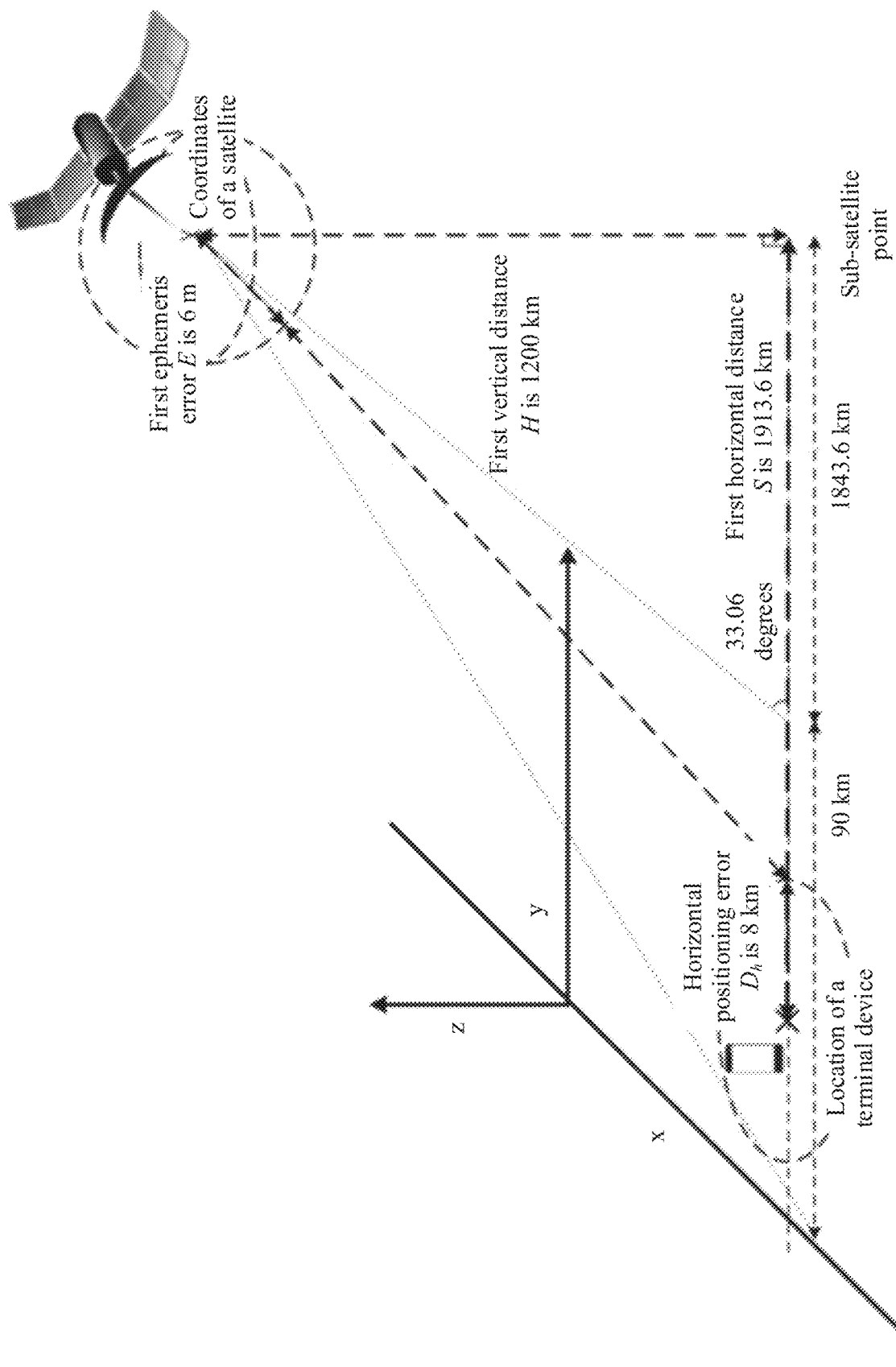
FIG. 11 is a schematic diagram of another embodiment of a method for determining a timing advance according to an embodiment of this application.

FIG. 11 is a schematic diagram of another embodiment of a method for determining a timing advance according to an embodiment of this application.

A scenario in which the distance between the location of the satellite and the altitude in which the terminal device is located is 1200 kilometers, in other words, the first vertical distance (H) is 1200 kilometers; the distance between the sub-satellite point of the satellite and the terminal device is 1913.6 kilometers, in other words, the first horizontal distance (S) is 1913.6 kilometers; the first ephemeris error (E) of the satellite is 6 meters; and the horizontal positioning error ($D_h$) of the terminal device is 10 kilometers is used as an example for description.

To consider the positioning error of the terminal device and the ephemeris error of the satellite in the process of determining the timing advance, the distance selected when the timing advance is determined is the distance between the terminal device and the satellite minus the positioning error and then minus the ephemeris error. In a scenario corresponding to FIG. 11, the terminal device may exist at any point in a circle formed by using the coordinates of the terminal device as the center of the circle and the horizontal positioning error as the radius. The satellite may exist at any point in a sphere formed by using the coordinates of the satellite as the center of the sphere and the first ephemeris error as the radius.

As shown in FIG. 11, a plane is determined based on a connection line between the sub-satellite point and the coordinates of the satellite, and a connection line between the coordinates of the terminal device and the sub-satellite point. In the plane, a cross section of the circle in which the terminal device is located is a line segment whose length is twice the horizontal positioning error. In the plane, a cross section of the sphere in which the satellite is located is a circle. A shortest distance between the line segment and the circle is a distance between a point that is in the line segment and that is closest to the coordinates of the satellite and the center of the circle minus the first ephemeris error (the radius of the circle). A specific calculation method is as follows.

$$TA = 2(\sqrt{(H)^2 + (S - D_h)^2} - E)/c;$$

$$TA = 2(\sqrt{(1200)^2 + (1913.6 - 10)^2} - 0.006)/3*10^5; \text{ and}$$

$$TA = 0.01500,$$

where

TA represents the timing advance, H represents the first vertical distance, S represents the first horizontal distance, $D_h$ represents the horizontal positioning error of the terminal device, E represents the first ephemeris error of the satellite, and c represents the light speed constant.

In this embodiment of this application, the method for determining the timing advance when the terminal device has only the two-dimensional positioning capability is provided. In addition, because the horizontal positioning error of the terminal device and the ephemeris error of the satellite are considered in the process of determining the timing advance, the timing advance determined according to the preset rule is closer to an actual delay situation, and it is ensured that the random access preamble sent by the terminal device by using the using timing advance can reach the satellite within a correct time period.

The foregoing describes the solutions provided in the embodiments of this application. It may be understood that to implement the foregoing functions, the terminal device includes corresponding hardware structures and/or software modules for performing the functions. A person skilled in the art should be easily aware that, in combination with the examples of modules and algorithm steps described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the terminal device may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that in the embodiments of this application, division into the modules is an example and is merely logical function division, and may be another division manner in an actual implementation.

Figure 12:
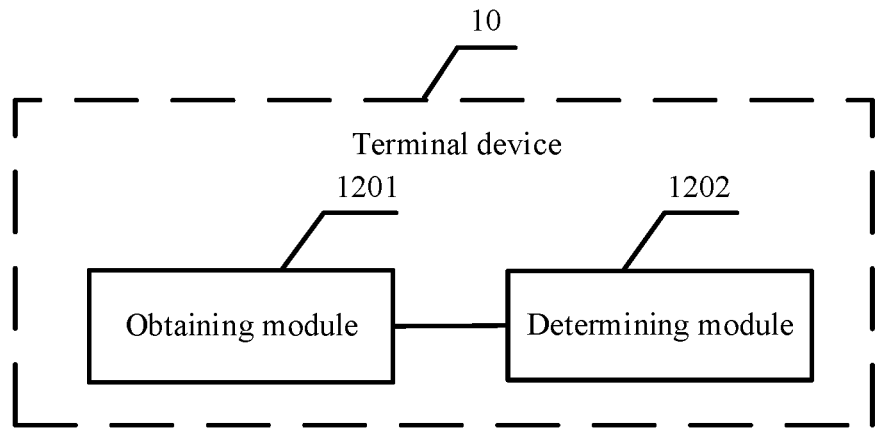
FIG. 12 is a schematic diagram of an embodiment of a terminal device according to an embodiment of this application.

The symmetric device in this application is described in detail below. FIG. 12 is a schematic diagram of an embodiment of a terminal device according to an embodiment of this application. A terminal device 10 includes:

an obtaining module 1201, configured to obtain ephemeris information of a satellite, where the ephemeris information includes coordinates of the satellite and an ephemeris error of the satellite; and a determining module 1202, configured to determine, according to a preset rule, a timing advance based on the ephemeris information and location information of the terminal device 10. The location information of the terminal device 10 includes coordinates of the terminal device 10 and a positioning error of the terminal device 10. The preset rule is determined by using a first horizontal distance, a first vertical distance, the ephemeris error, and the positioning error. The first horizontal distance and the first vertical distance are obtained through calculation by using the coordinates of the terminal device 10 and the coordinates of the satellite.

In some embodiments of this application, the terminal device 10 includes:

the determining module 1202, specifically configured to determine the timing advance based on the first horizontal distance, the first vertical distance, a first positioning error of the terminal device 10, and a first ephemeris error of the satellite, where the ephemeris error includes the first ephemeris error of the satellite, and the positioning error includes the first positioning error of the terminal device 10.

The preset rule specifically includes:

$$TA = 2(\sqrt{H^2 + S^2} - D - E)/c,$$

where

TA represents the timing advance, H represents the first vertical distance, S represents the first horizontal distance, D represents the first positioning error of the terminal device 10, E represents the first ephemeris error of the satellite, and c represents the light speed constant.

In some embodiments of this application, the terminal device 10 includes:

the determining module 1202, specifically configured to determine the timing advance based on the first horizontal distance, the first vertical distance, a horizontal positioning error of the terminal device 10, a vertical positioning error of the terminal device 10, and a first ephemeris error of the satellite, where the positioning error includes the horizontal positioning error of the terminal device 10 and the vertical positioning error of the terminal device 10, and the ephemeris error includes the first ephemeris error of the satellite.

The preset rule specifically includes:

$$TA = 2(\sqrt{(H - D_V)^2 + (S - D_h)^2} - E)/c,$$

where

TA represents the timing advance, H represents the first vertical distance, S represents the first horizontal distance, $D_v$ represents the vertical positioning error of the terminal device 10, $D_h$ represents the horizontal positioning error of the terminal device 10, E represents the first ephemeris error of the satellite, and c represents the light speed constant.

In some embodiments of this application, the terminal device 10 includes:

the determining module 1202, specifically configured to determine the timing advance based on the first horizontal distance, the first vertical distance, a horizontal positioning error of the terminal device 10, a vertical positioning error of the terminal device 10, a horizontal ephemeris error of the satellite, and a vertical ephemeris error of the satellite, where the positioning error includes the horizontal positioning error of the terminal device 10 and the vertical positioning error of the terminal device 10, and the ephemeris error includes the horizontal ephemeris error of the satellite and the vertical ephemeris error of the satellite.

The preset rule specifically includes:

$$TA = 2\sqrt{(H - D_V - E_V)^2 + (S - D_h - E_h)^2}/c,$$

where

TA represents the timing advance, H represents the first vertical distance, S represents the first horizontal distance, $D_v$ represents the vertical positioning error of the terminal device 10, $D_h$ represents the horizontal positioning error of the terminal device 10, $E_v$ represents the vertical ephemeris error of the satellite, $E_h$ represents the horizontal ephemeris error of the satellite, and c represents the light speed constant.

In some embodiments of this application, the terminal device 10 includes:

the determining module 1202, specifically configured to determine the timing advance based on the first horizontal distance, the first vertical distance, a horizontal positioning error of the terminal device 10, and a first ephemeris error of the satellite, where the positioning error includes the horizontal positioning error of the terminal device 10, and the ephemeris error includes the first ephemeris error of the satellite.

The preset rule specifically includes:

$$TA = 2(\sqrt{H^2 + (S - D_n)^2} - E)/c,$$

where

TA represents the timing advance, H represents the first vertical distance, S represents the first horizontal distance, $D_h$ represents the horizontal positioning error of the terminal device 10, E represents the first ephemeris error of the satellite, and c represents the light speed constant.

In some embodiments of this application, the terminal device 10 includes:

the obtaining module 11201, further configured to obtain a common timing advance, where the common timing advance is sent by the satellite;

the determining module 1202, further configured to determine a using timing advance of the terminal device 10 based on the common timing advance and the timing advance;

the determining module 1202, further configured to: if the common timing advance is greater than the timing advance, determine that the common timing advance is the using timing advance; and the determining module 1202 is further configured to: if the common timing advance is less than or equal to the timing advance, determine that the timing advance is the using timing advance.

In the foregoing embodiments, the determining module may be implemented by a processor, and the obtaining module may be implemented by a receiver, a receiving circuit, or an input interface.

It should be noted that content such as information exchange between the modules/units of the apparatus and the execution processes thereof is based on a same idea as the method embodiments of this application, and therefore brings same technical effects as the method embodiments of this application. For specific content, refer to the foregoing description in the method embodiments of this application.

Details are not described herein again.

Figure 13:
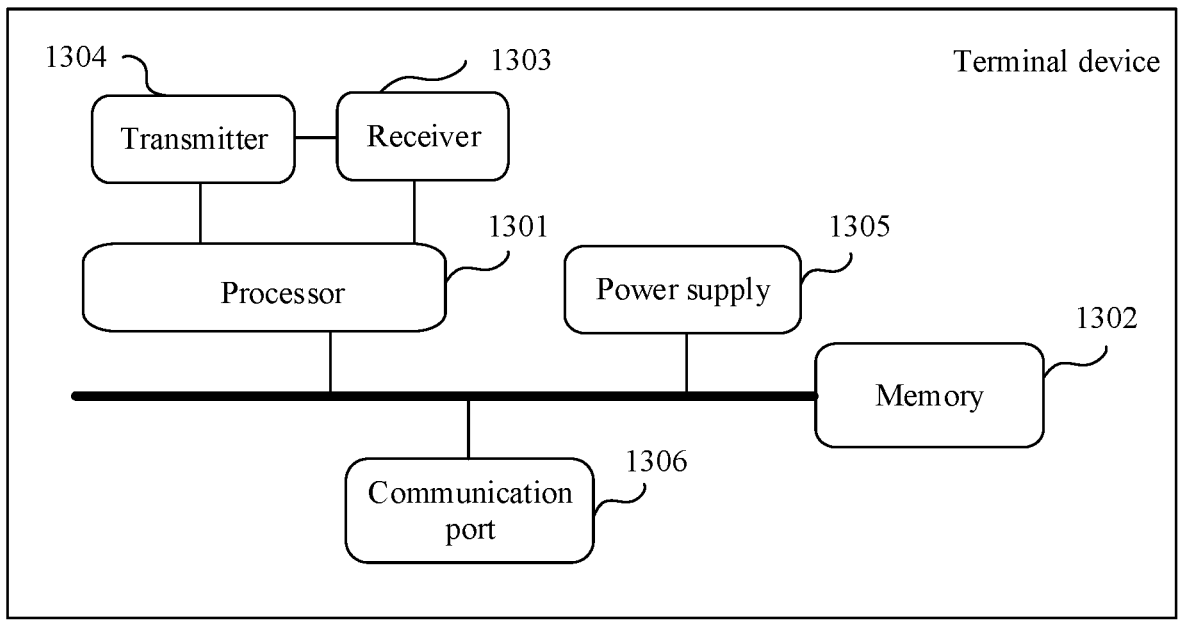
FIG. 13 is a schematic diagram of a structure of a terminal device according to an embodiment of this application.

FIG. 13 is a schematic diagram of a structure of a terminal device according to an embodiment of this application. The terminal device may include a processor 1301 (for example, a CPU), a memory 1302, a transmitter 1304, and a receiver 1303. The transmitter 1304 and the receiver 1303 are coupled to the processor 1301, and the processor 1301 controls a sending action of the transmitter 1304 and a receiving action of the receiver 1303. The memory 1302 may include a high-speed RAM memory; or may include a nonvolatile memory NVM, for example, at least one magnetic disk memory. The memory 1302 may store various instructions used to perform various processing functions and implement the method steps in the embodiments of this application. Optionally, the terminal device in this embodiment of this application may further include one or more of a power supply 1305 and a communication port 1306. The components described in FIG. 13 may be connected through a communication bus, or may be connected in another connection manner. This is not limited in this embodiment of this application. The receiver 1303 and the transmitter 1304 may be integrated into a transceiver of the terminal device, or may be a receive antenna and a transmit antenna that are independent of each other on the terminal device. The communication bus is configured to implement communication connections between the components. The communication port 1306 is configured to implement connection and communication between the terminal device and another peripheral.

In some embodiments, the processor 1301 in the terminal device may perform an action performed by the determining module 1202 in FIG. 12, and the receiver 1303 in the terminal device may perform an action performed by the obtaining module 11201 in FIG. 12. An implementation principle and a technical effect thereof are similar, and details are not described herein again.

In some embodiments, the memory 1302 is configured to store computer-executable program code, and the program code includes instructions. When the processor 1301 executes the instructions, the instructions enable the processor 1301 to perform an action performed by the processing module of the terminal device in the foregoing embodiments. Details are not described herein again.

Figure 14:
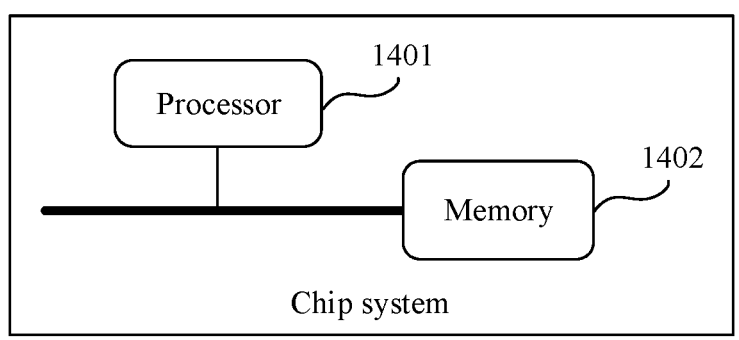
FIG. 14 is a schematic diagram of a structure of a chip system according to an embodiment of this application.

This application further provides a chip system. Refer to FIG. 14. The chip system includes a processor 1401 and a memory 1402. The memory 1402 is configured to store program instructions and data that are necessary for a terminal device. The chip system may include a chip, or may include a chip and another discrete component.

In a possible design, the chip system further includes a power supply and a transceiver (not shown in FIG. 14), configured to support the foregoing terminal device to implement a function of the foregoing terminal device, for example, receiving, by using the transceiver, data and/or information, for example, location information of the terminal device, in the foregoing method embodiments. After receiving the data and/or information in the foregoing method embodiments, the transceiver sends the data and/or information to the processor 1401, so that the processor 1401 processes the data and/or information.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (Digital Subscriber Line, DSL)) or wireless (for example, infrared, radio, or microwave) manner. The computer-readable storage medium may be any usable medium accessible to the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (Solid-State Disk, SSD)), or the like.

It may be clearly understood by a person skilled in the art that, for purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

Units described as separate parts may or may not be physically separate, and parts displayed as units may or may not be physical units, may be located in one position, or may be distributed on a plurality of network units. Some or all of the units may be selected based on an actual requirement, to achieve an objective of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to a conventional technology, or all or some of the technical solutions may be implemented in a form of a software product. The computer software product is stored in a storage medium and includes several instructions for enabling a computer device (which may be a personal computer, a server, a network device, or the like) to perform all or some of the steps of the methods described in the embodiments of this application. The foregoing storage medium includes various media that can store program code, such as a USB flash drive, a removable hard disk, a read-only memory (Read-Only Memory, ROM), a random access memory (Random Access Memory, RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A method for determining a timing advance, comprising:
    obtaining ephemeris information of a satellite, wherein the ephemeris information comprises coordinates of the satellite and an ephemeris error of the satellite; and
    determining, according to a preset rule, the timing advance based on the ephemeris information and location information of a terminal device, wherein the location information of the terminal device comprises coordinates of the terminal device and a positioning error of the terminal device, and
    wherein the preset rule is determined by using a first horizontal distance, a first vertical distance, the ephemeris error, and the positioning error, and wherein the first horizontal distance and the first vertical distance are obtained through calculation by using the coordinates of the terminal device and the coordinates of the satellite.

2. The method according to claim 1, wherein the determining, according to a preset rule, the timing advance based on the ephemeris information and location information of a terminal device comprises:
    determining the timing advance based on the first horizontal distance, the first vertical distance, a first positioning error of the terminal device, and a first ephemeris error of the satellite, wherein the ephemeris error comprises the first ephemeris error of the satellite, and the positioning error comprises the first positioning error of the terminal device.

3. The method according to claim 2, wherein the preset rule comprises:

$$TA = 2\left(\sqrt{H^2 + S^2} - D - E\right)/c,$$

wherein
    TA represents the timing advance, H represents the first vertical distance, S represents the first horizontal distance, D represents the first positioning error of the terminal device, E represents the first ephemeris error of the satellite, and c represents a light speed constant.

4. The method according to claim 1, wherein the determining, according to a preset rule, the timing advance based on the ephemeris information and location information of a terminal device comprises:
    determining the timing advance based on the first horizontal distance, the first vertical distance, a horizontal positioning error of the terminal device, a vertical positioning error of the terminal device, and a first ephemeris error of the satellite, wherein the positioning error comprises the horizontal positioning error of the terminal device and the vertical positioning error of the terminal device, and the ephemeris error comprises the first ephemeris error of the satellite.

5. The method according to claim 4, wherein the preset rule comprises:

$$TA = 2\left(\sqrt{(H - D_V)^2 + (S - D_h)^2} - E\right)/c,$$

wherein:
    TA represents the timing advance, H represents the first vertical distance, S represents the first horizontal distance, $D_v$ represents the vertical positioning error of the terminal device, IA represents the horizontal positioning error of the terminal device, E represents the first ephemeris error of the satellite, and c represents the light speed constant.

6. The method according to claim 1, wherein the determining, according to a preset rule, the timing advance based on the ephemeris information and location information of a terminal device comprises:
    determining the timing advance based on the first horizontal distance, the first vertical distance, a horizontal positioning error of the terminal device, a vertical positioning error of the terminal device, a horizontal ephemeris error of the satellite, and a vertical ephemeris error of the satellite, wherein the positioning error comprises the horizontal positioning error of the terminal device and the vertical positioning error of the terminal device, and the ephemeris error comprises the horizontal ephemeris error of the satellite and the vertical ephemeris error of the satellite.

7. The method according to claim 6, wherein the preset rule comprises:

$$TA = 2\sqrt{(H - D_V - E_V)^2 + (S - D_h - E_h)^2}/c,$$

wherein
    TA represents the timing advance, H represents the first vertical distance, S represents the first horizontal distance, $D_v$ represents the vertical positioning error of the terminal device, $D_h$ represents the horizontal positioning error of the terminal device, $E_v$ represents the vertical ephemeris error of the satellite, $E_h$ represents the horizontal ephemeris error of the satellite, and c represents the light speed constant.

8. The method according to claim 1, wherein the determining, according to a preset rule, the timing advance based on the ephemeris information and location information of a terminal device comprises:
    determining the timing advance based on the first horizontal distance, the first vertical distance, a horizontal positioning error of the terminal device, and a first ephemeris error of the satellite, wherein the positioning error comprises the horizontal positioning error of the terminal device, and the ephemeris error comprises the first ephemeris error of the satellite.

9. The method according to claim 8, wherein the preset rule comprises:

$$TA = 2\left(\sqrt{H^2 + (S - D_h)^2} - E\right)/c,$$

wherein
TA represents the timing advance, H represents the first vertical distance, S represents the first horizontal distance, $D_h$ represents the horizontal positioning error of the terminal device, E represents the first ephemeris error of the satellite, and c represents the light speed constant.

10. The method according to claim 1, wherein after determining the timing advance according to the preset rule, the method further comprises:
obtaining a common timing advance, wherein the common timing advance is sent by the satellite;
determining a using timing advance of the terminal device based on the common timing advance and the timing advance; and
if the common timing advance is greater than the timing advance, determining that the common timing advance is the using timing advance; or
if the common timing advance is less than or equal to the timing advance, determining that the timing advance is the using timing advance.

11. The method according to claim 1, wherein the ephemeris error of the satellite is broadcast by the satellite.

12. A terminal device, wherein the terminal device comprises:
at least one processor; and
one or more memories coupled to the at least one processor and storing programing instructions for execution by the at least one processor to:
obtain ephemeris information of a satellite, wherein the ephemeris information comprises coordinates of the satellite and an ephemeris error of the satellite; and
determine, according to a preset rule, a timing advance based on the ephemeris information and location information of the terminal device, wherein the location information of the terminal device comprises coordinates of the terminal device and a positioning error of the terminal device, and
wherein the preset rule is determined by using a first horizontal distance, a first vertical distance, the ephemeris error, and the positioning error, wherein the first horizontal distance and the first vertical distance are obtained through calculation by using the coordinates of the terminal device and the coordinates of the satellite.

13. The terminal device according to claim 12, wherein the one or more memories store the programing instructions for execution by the at least one processor to:
determine the timing advance based on the first horizontal distance, the first vertical distance, a first positioning error of the terminal device, and a first ephemeris error of the satellite, wherein the ephemeris error comprises the first ephemeris error of the satellite, and the positioning error comprises the first positioning error of the terminal device.

14. The terminal device according to claim 13, wherein the preset rule comprises:

$$TA = 2(\sqrt{H^2 + S^2} - D - E)/c,$$

wherein
TA represents the timing advance, H represents the first vertical distance, S represents the first horizontal distance, D represents the first positioning error of the terminal device, E represents the first ephemeris error of the satellite, and c represents a light speed constant.

15. The terminal device according to claim 12, wherein the one or more memories store the programing instructions for execution by the at least one processor to:
determine the timing advance based on the first horizontal distance, the first vertical distance, a horizontal positioning error of the terminal device, a vertical positioning error of the terminal device, and a first ephemeris error of the satellite, wherein the positioning error comprises the horizontal positioning error of the terminal device and the vertical positioning error of the terminal device, and the ephemeris error comprises the first ephemeris error of the satellite.

16. The terminal device according to claim 15, wherein the preset rule comprises:

$$TA = 2\left(\sqrt{(H - D_V)^2 + (S - D_h)^2} - E\right)/c,$$

wherein:
TA represents the timing advance, H represents the first vertical distance, S represents the first horizontal distance, $D_v$ represents the vertical positioning error of the terminal device, $D_h$ represents the horizontal positioning error of the terminal device, E represents the first ephemeris error of the satellite, and c represents a light speed constant.

17. The terminal device according to claim 12, wherein the one or more memories store the programing instructions for execution by the at least one processor to:
determine the timing advance based on the first horizontal distance, the first vertical distance, a horizontal positioning error of the terminal device, a vertical positioning error of the terminal device, a horizontal ephemeris error of the satellite, and a vertical ephemeris error of the satellite, wherein the positioning error comprises the horizontal positioning error of the terminal device and the vertical positioning error of the terminal device, and the ephemeris error comprises the horizontal ephemeris error of the satellite and the vertical ephemeris error of the satellite.

18. The terminal device according to claim 17, wherein the preset rule comprises:

$$TA = 2\sqrt{(H - D_V - E_V)^2 + (S - D_h - E_h)^2}/c,$$

wherein:
TA represents the timing advance, H represents the first vertical distance, S represents the first horizontal distance, $D_v$ represents the vertical positioning error of the terminal device, $D_h$ represents the horizontal positioning error of the terminal device, $E_v$ represents the vertical ephemeris error of the satellite, $E_h$ represents the horizontal ephemeris error of the satellite, and c represents the light speed constant.

19. The terminal device according to claim 12, wherein the one or more memories store the programing instructions for execution by the at least one processor to:
determine the timing advance based on the first horizontal distance, the first vertical distance, a horizontal positioning error of the terminal device, and a first ephemeris error of the satellite, wherein the positioning error comprises the horizontal positioning error of the terminal device, and the ephemeris error comprises the first ephemeris error of the satellite.

20. A non-transitory computer readable storage medium, wherein the non-transitory computer readable storage medium stores programing instructions for execution by at least one processor to:
obtain ephemeris information of a satellite, wherein the ephemeris information comprises coordinates of the satellite and an ephemeris error of the satellite; and
determine, according to a preset rule, a timing advance based on the ephemeris information and location information of the terminal device, wherein the location information of the terminal device comprises coordinates of the terminal device and a positioning error of the terminal device, and
wherein the preset rule is determined by using a first horizontal distance, a first vertical distance, the ephemeris error, and the positioning error, and wherein the first horizontal distance and the first vertical distance are obtained through calculation by using the coordinates of the terminal device and the coordinates of the satellite.

* * * * *

UNITED STATES PATENT AND TRADEMARK OFFICE
CERTIFICATE OF CORRECTION

PATENT NO. : 11,743,854 B2
APPLICATION NO. : 17/671335
DATED : August 29, 2023
INVENTOR(S) : Xiaolu Wang et al.

It is certified that error appears in the above-identified patent and that said Letters Patent is hereby corrected as shown below:

In the Claims

In Column 23, Line 54, Claim 3, please delete "wherein" and insert therefore -- wherein: --;

In Column 24, Line 18, Claim 5, please delete "IA" and insert therefore -- $D_h$ --;

In Column 24, Line 47, Claim 7, please delete "wherein" and insert therefore -- wherein: --;

In Column 25, Line 8 (approx.), Claim 9, please delete "wherein" and insert therefore -- wherein: --.

Signed and Sealed this
Twenty-eighth Day of May, 2024

Katherine Kelly Vidal
*Director of the United States Patent and Trademark Office*